(12) United States Patent
Schmitz et al.

(10) Patent No.: US 8,608,610 B2
(45) Date of Patent: Dec. 17, 2013

(54) TRANSMISSION UNIT

(75) Inventors: Michael Schmitz, Niederelbert (DE); Christoph Lermen, Stuttgart (DE)

(73) Assignee: Pinion GmbH, Stuttgart (DE)

( * ) Notice: Subject to any disclaimer, the term of this patent is extended or adjusted under 35 U.S.C. 154(b) by 0 days.

(21) Appl. No.: 13/164,877

(22) Filed: Jun. 21, 2011

(65) Prior Publication Data

US 2011/0251008 A1    Oct. 13, 2011

Related U.S. Application Data

(63) Continuation of application No. PCT/EP2009/009193, filed on Dec. 21, 2009.

(30) Foreign Application Priority Data

Dec. 22, 2008 (DE) .......................... 10 2008 064 514

(51) Int. Cl.
  *F16H 37/02* (2006.01)
(52) U.S. Cl.
  USPC ................................ 475/207; 74/351; 74/361
(58) Field of Classification Search
  USPC ........... 74/351, 352, 361, 369, 375; 192/48.2, 192/48.612, 48.92, 71, 93 C, 96; 475/207
  See application file for complete search history.

(56) References Cited

U.S. PATENT DOCUMENTS

| | | | | |
|---|---|---|---|---|
| 1,223,862 A * | 4/1917 | Eaton | ................................ | 74/375 |
| 1,749,569 A * | 3/1930 | De Florez | ........................ | 137/10 |
| 5,924,950 A * | 7/1999 | Pusic | ............................ | 475/207 |
| 6,223,613 B1 * | 5/2001 | Martin | ............................. | 74/368 |
| 6,440,032 B1 * | 8/2002 | Stauber et al. | ................ | 475/207 |
| 6,698,303 B2 * | 3/2004 | Hoffmann et al. | ........... | 74/337.5 |
| 8,316,730 B2 * | 11/2012 | Matsumoto | .................. | 74/337.5 |
| 2001/0017061 A1 * | 8/2001 | Friel | ................................ | 74/375 |
| 2005/0221943 A1 * | 10/2005 | Kuhstrebe | ..................... | 475/207 |

FOREIGN PATENT DOCUMENTS

| | | |
|---|---|---|
| DE | 10 2005 053315 A1 | 5/2007 |
| EP | 1 445 088 A2 | 8/2004 |
| WO | WO2008/089932 A1 | 7/2008 |

OTHER PUBLICATIONS

International Search Report for PCT/EP2009/009193, Mar. 22, 2010, 2 pages (translated).

* cited by examiner

*Primary Examiner* — Justin Holmes
*Assistant Examiner* — Huan Le
(74) *Attorney, Agent, or Firm* — Reising Ethington P.C.

(57) ABSTRACT

The present invention relates to a transmission unit for a vehicle driven by muscle force, comprising an input shaft which can be connected to cranks on opposite sides for driving the vehicle, comprising a first partial transmission. The first partial transmission comprises a countershaft, wherein a plurality of driving gear wheels is mounted on the input shaft, and wherein a corresponding plurality of driven gear wheels of the first partial transmission is mounted on the partial transmission shaft. The driven gear wheels of the first partial transmission are designed as idler gears that can be connected to the countershaft by means of shifting means in a rotationally rigid manner. The countershaft forms an input shaft of a second partial transmission. A plurality of second drive wheels are mounted on the output shaft, wherein the second partial transmission comprises an output shaft, on which a corresponding plurality of second driven gear wheels are mounted.

26 Claims, 27 Drawing Sheets

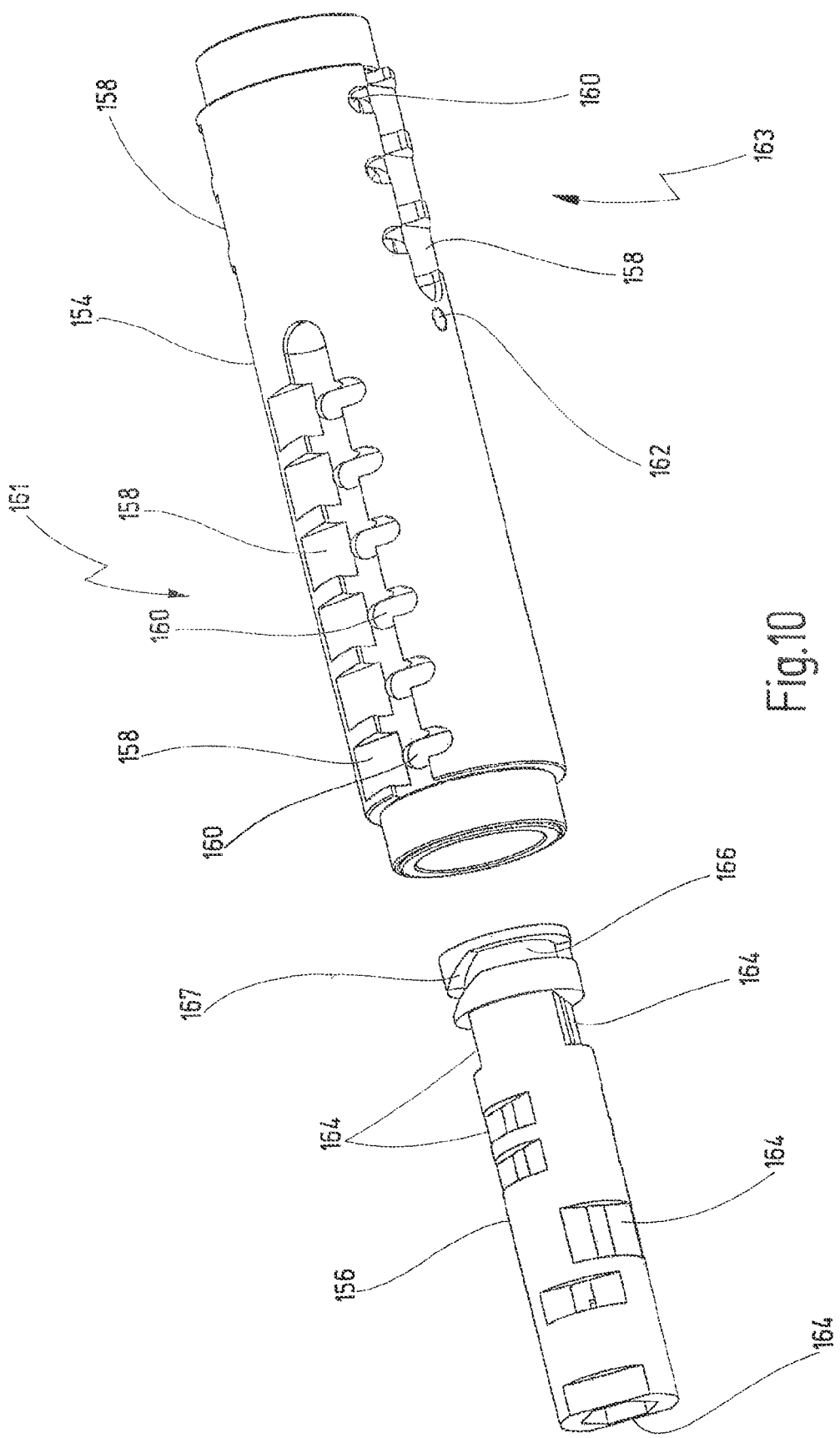

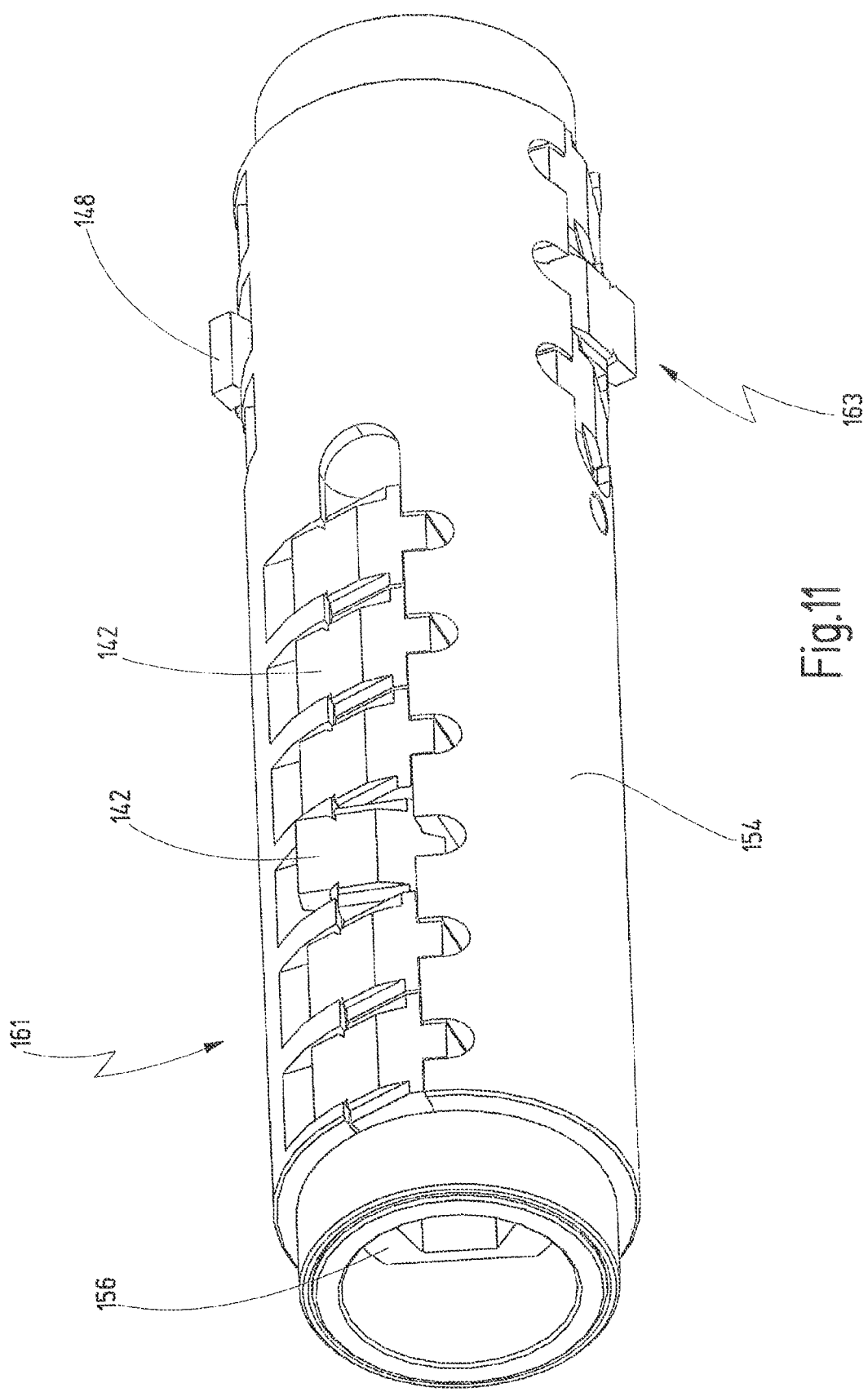

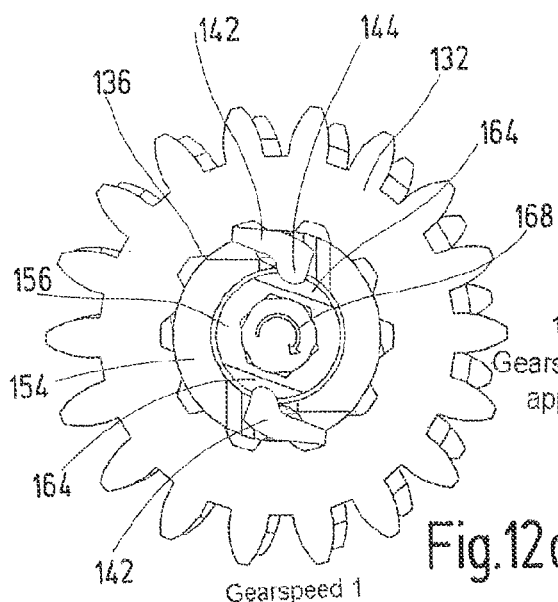
Fig.12a Gearspeed 1
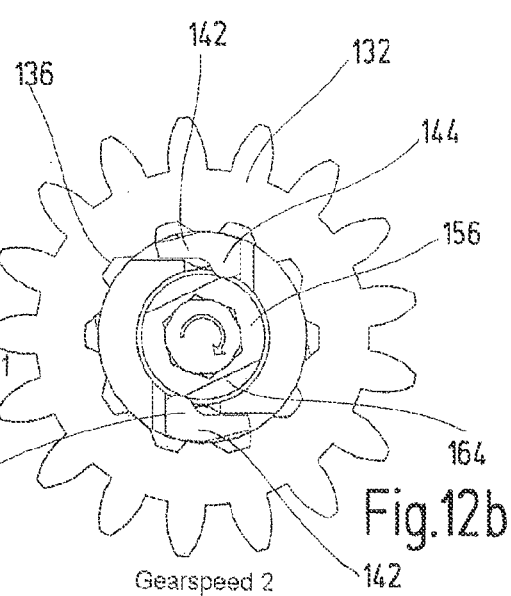
Fig.12b Gearspeed 2
1. Gearspeed 1 applied
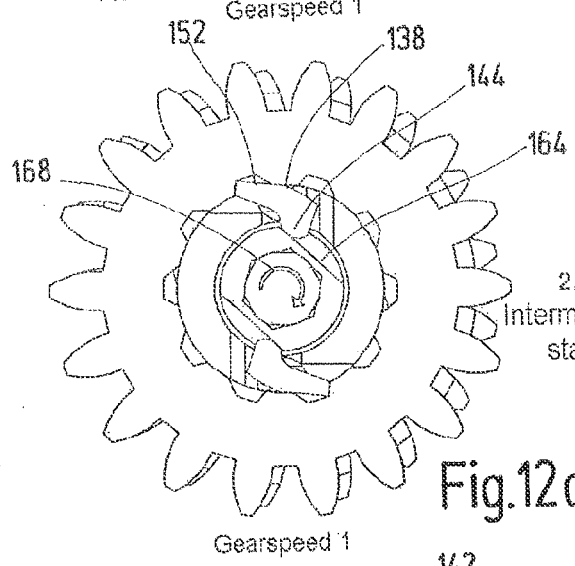
Fig.12c Gearspeed 1
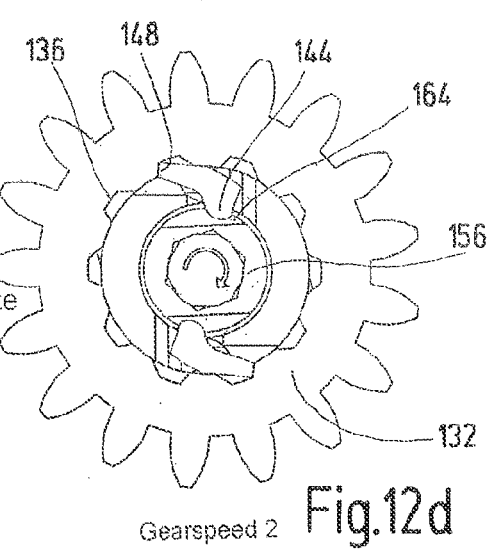
Fig.12d Gearspeed 2
2. Intermediate state
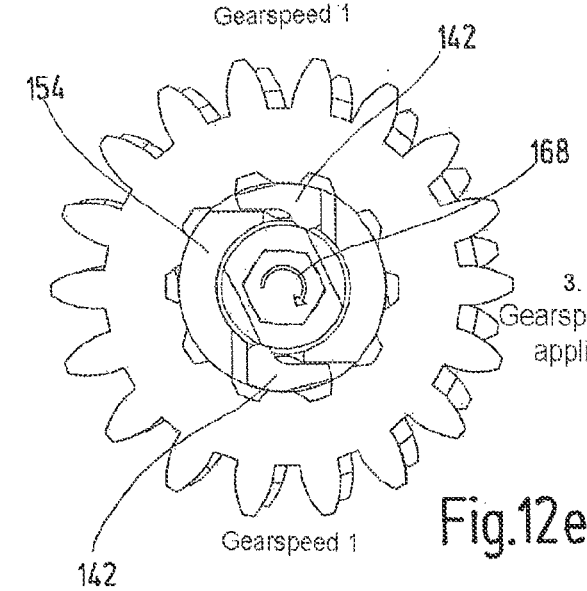
Fig.12e Gearspeed 1
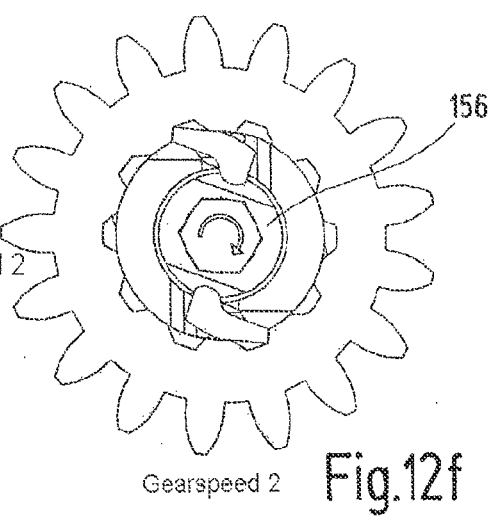
Fig.12f Gearspeed 2
3. Gearspeed 2 applied

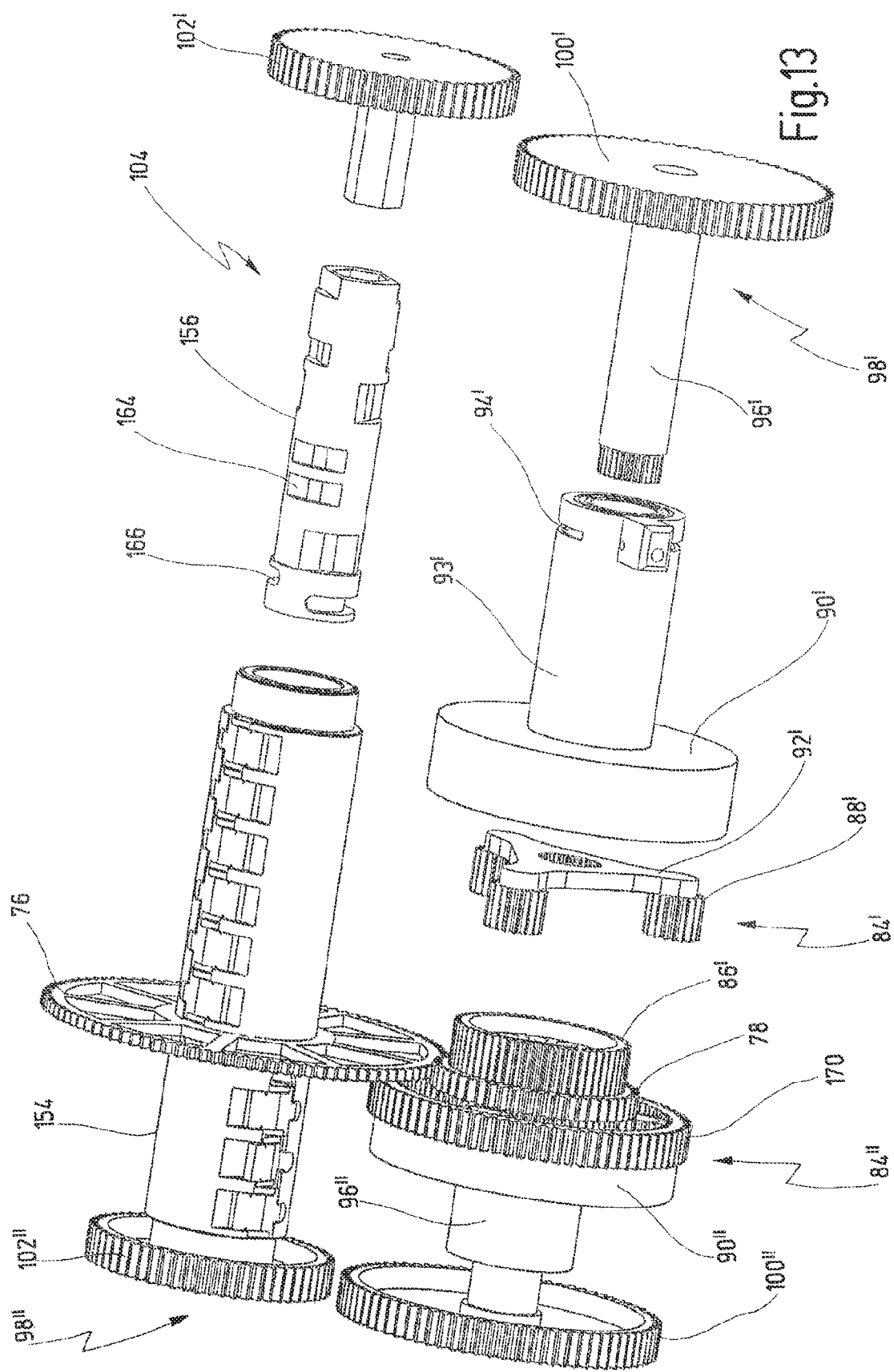

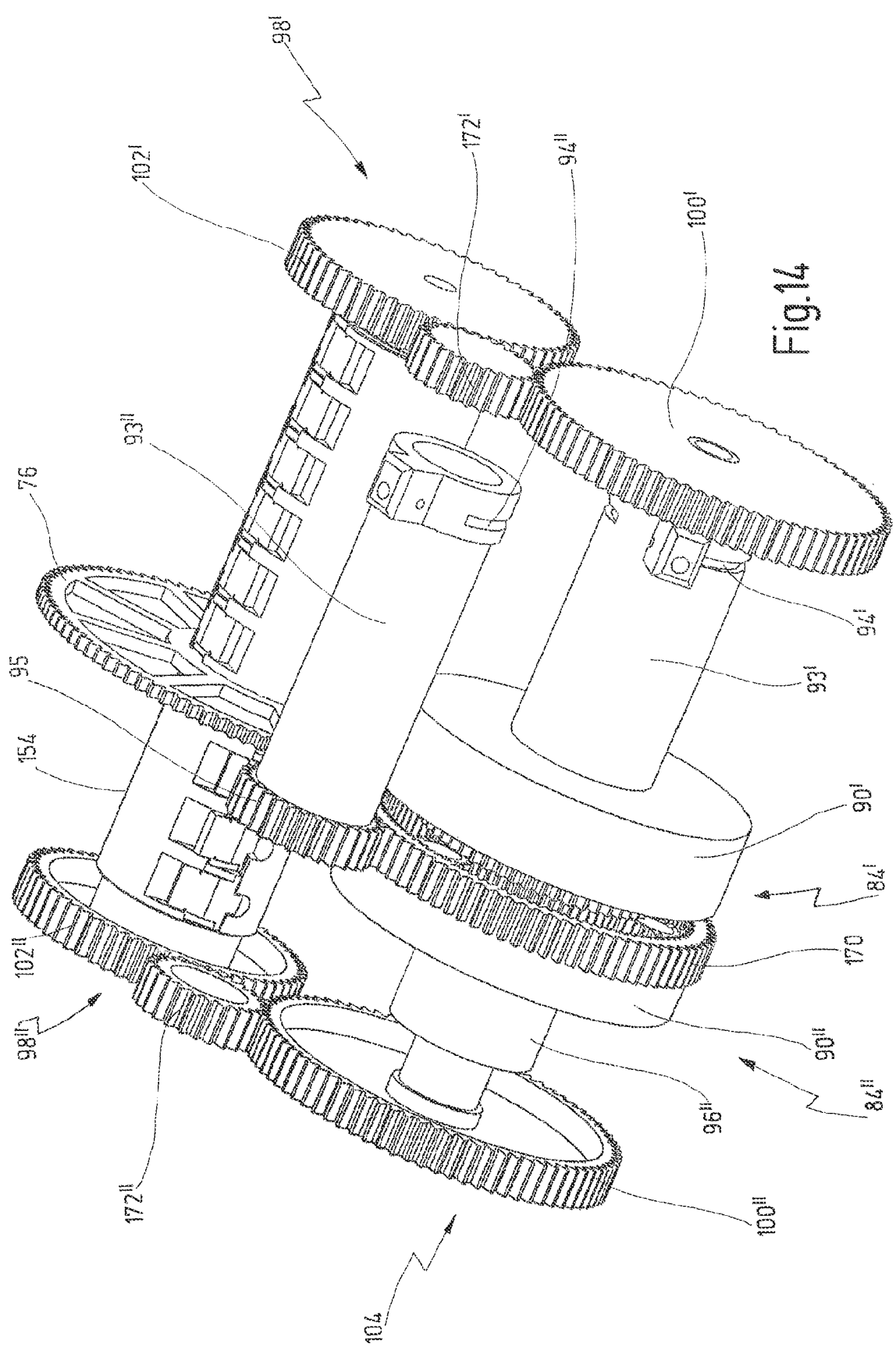

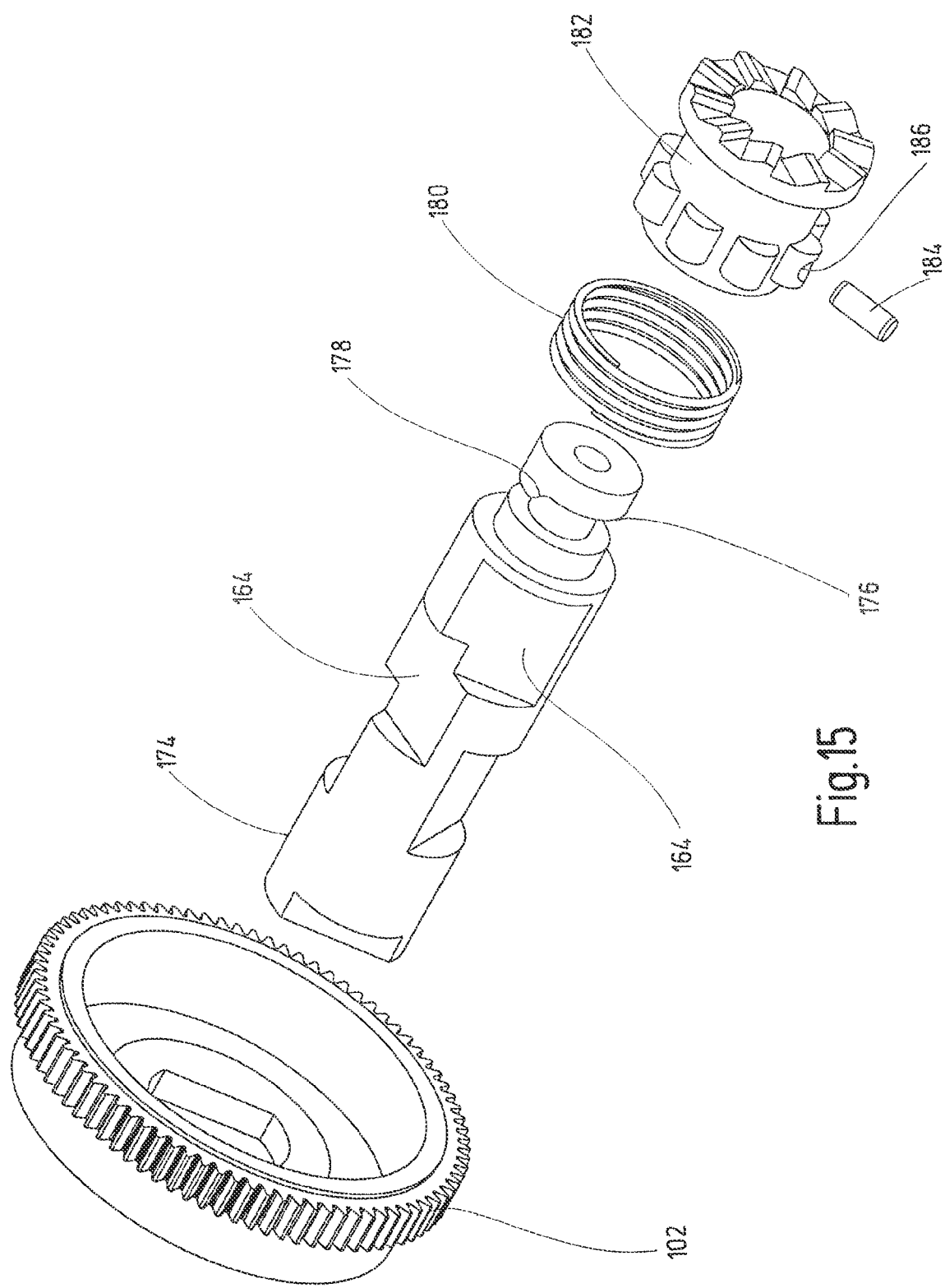

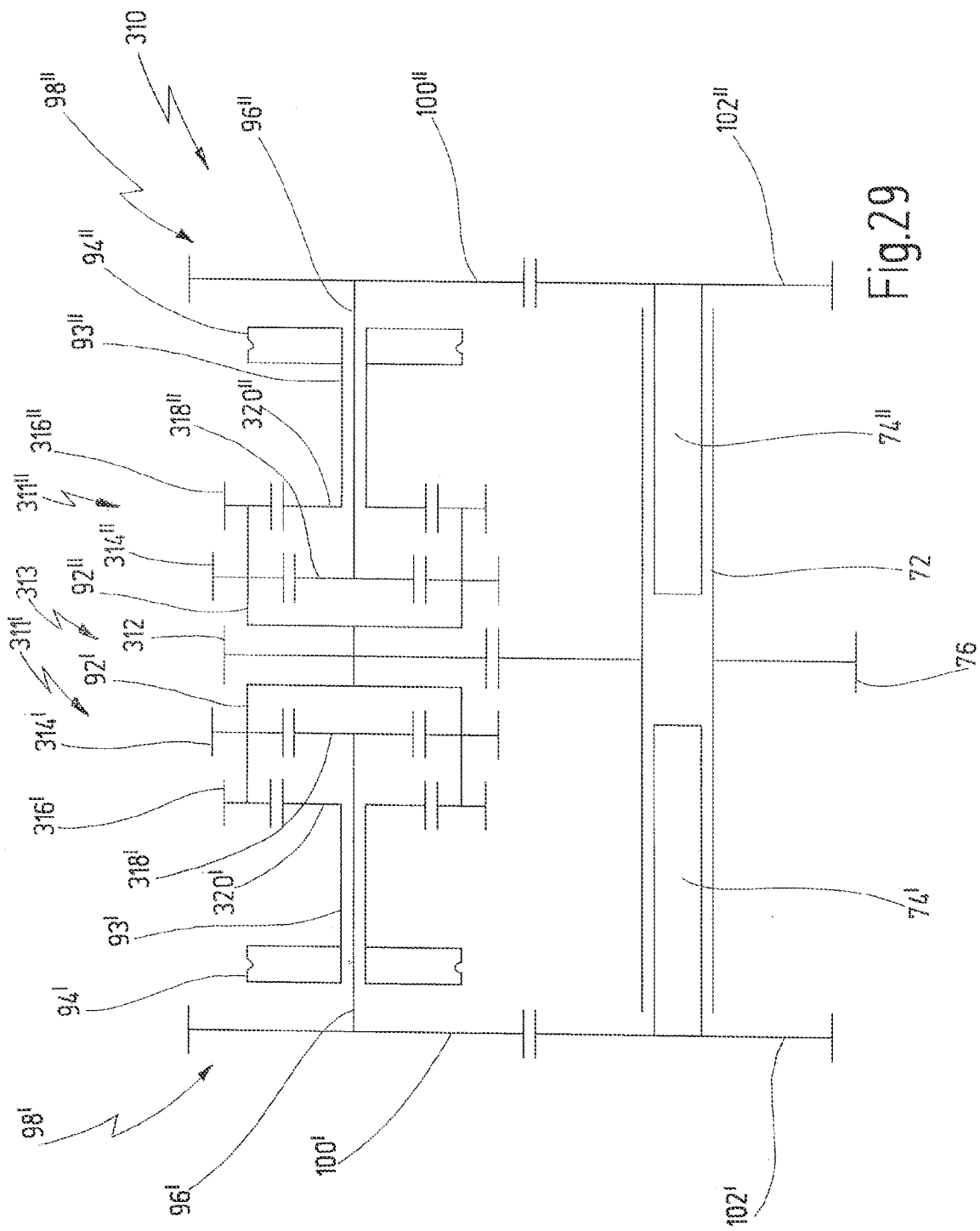

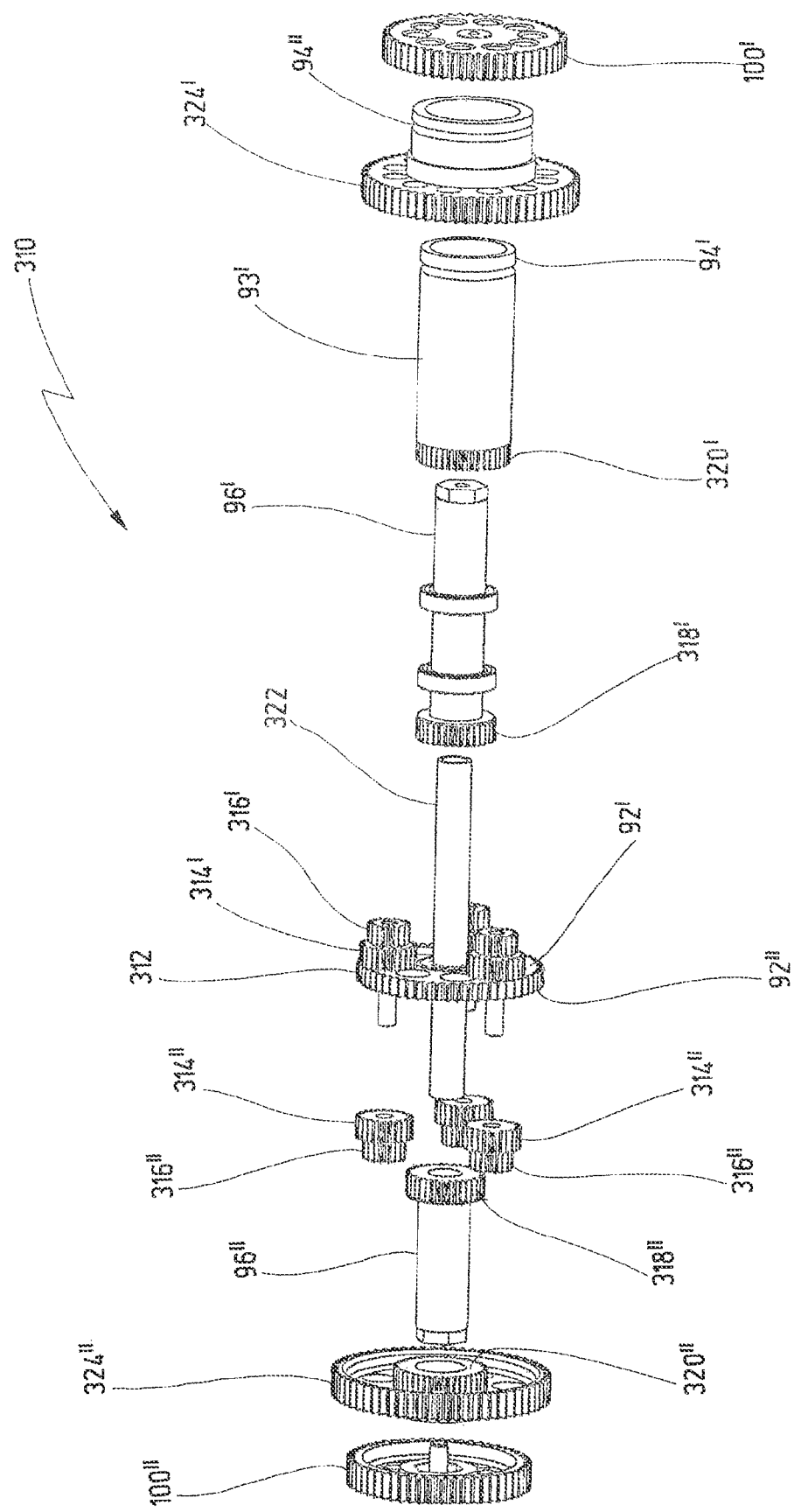

TRANSMISSION UNIT

CROSS-REFERENCE TO RELATED APPLICATIONS

This application is a continuation of international Patent Application No. PCT/EP 2009/009193, filed Dec. 21, 2009, the complete contents of which are hereby incorporated by reference.

BACKGROUND OF THE INVENTION

The invention relates to a shifting device for a transmission unit of a vehicle operated by muscle force.

The invention also relates to a transmission unit for a vehicle operated muscle force.

The invention additionally relates to a transmission housing for a transmission unit of a vehicle driven by muscle force.

Such transmission units serve to step up or step down the muscle force and as a result the provision of driving force to the vehicle.

Basically, there are three types of gearshifts for vehicles or motorbikes which are driven by muscle force, specifically derailleur gearshifts, hub gearshifts and bicycle gearshifts.

The derailleur gearshift has not changed significantly in the last decades. In this context, a chain transmits the driving force from a foot pedal to the rear axle of the bicycle, wherein a sprocket cassette which is mounted on the rear axle is mounted with up to ten sprockets, between which sprockets it is possible to shift to and fro by means of a shifting mechanism for guiding the chain, which mechanism is attached to the frame. Furthermore, most bicycles are additionally equipped with a shifting means on the chainwheel of the bottom bracket. Here, up to three chainwheels are attached to the foot pedal, and it is possible to shift to and fro between said chainwheels by means of a derailer which is attached to the frame. Such derailer gearshifts offer up to thirty gearspeeds, but due to the system a large number of gearspeeds are redundant, and some gearspeeds cannot be used, or can only be used to a restricted degree, as a result of high frictional losses due to a diagonal course of the chain.

A disadvantage with the principle of the derailer gearshift is not only the large number of redundant gearspeeds and the frictional losses but also the fact that the components are exposed and are therefore subject directly to environmental influences such as water and dirt and can very easily be damaged by shocks.

The second type of commercially available bicycle gearshift is the hub gearshift. In contrast to the derailer gearshift, this is understood to be a gearshift which is installed in the hub housing of the rear axle. A hub gearshift usually does not have any shifting components which are located on the outside and is therefore insensitive to shocks and subject to a lesser degree to the environmental influences than the derailer gearshift. A hub gearshift such as is known, for example, from DE 197 20 794 A1 can currently implement up to 14 gearspeeds. A disadvantage with the principle of the hub gearshift in the rear axle is that the weight of the rotating masses is increased and, in the case of bicycles which have rear wheel suspension, the non-suspended mass is increased considered relative to the overall weight. In addition, the center of gravity of the bicycle is displaced in the direction of the rear axle, which has an unfavorable effect on the riding properties of the bicycle, in particular in the case of mountain bikes with rear wheel suspension.

Such a hub gearshift is known, for example, from EP 0 383 350 B1, in which two planetary gear mechanisms are arranged coaxially with respect to a hub which is fixed to the housing, wherein the input shaft can be connected to planetary carriers, and the sun gears of the planetary gear mechanisms can be connected in a rotationally fixed fashion via a rotatable shifting device to the hub which is fixed to the housing, in order to implement different transmission ratios of the transmission as a whole. A disadvantage with this transmission is that the transmission as a whole is complicated and accordingly is, on the one hand, costly to manufacture and, on the other hand, has, due to the large number of components, a large weight with, at the same time, small number of gearspeeds which can be implemented.

The third variant of the bicycle gearshift is the bicycle gear mechanism or bottom bracket gear mechanism which is mounted in the region of the bottom bracket. This type of bicycle gearshift is not widespread, or is only found rarely, in commercially available bicycles. In general, such bicycle gear mechanisms have the advantage over conventional derailer gearshifts or hub gearshifts that they do not have any exposed components and accordingly are protected against shocks and environmental influences, and on the other hand they displace the center of gravity of the bicycle into the center, in which case at the same time the sum of the non-suspended mass is reduced. This is of particular advantage in the sport of mounting biking. A technical requirement in such bicycle gear mechanisms is to implement a compact design accompanied at the same time by a large number of shiftable gearspeeds.

U.S. Pat. No. 5,924,950 A discloses a bicycle gear mechanism having an input shaft on which a multiplicity of driving gears are mounted, and a countershaft on which a corresponding number of shiftable driven gears is mounted. The shiftable gears of the countershaft are shifted by means of a plurality of axially displaceable shifting pins and freewheels which are arranged in the countershaft, wherein the countershaft is connected via a planetary gear mechanism to a sprocket as an output element of the bicycle gear mechanism. The sprocket is connected via a clutch to the sun gear of the planetary gear mechanism, and the ring gear of the planetary gear mechanism can be braked by means of a Bowden cable. Fourteen gearspeeds can be implemented by means of this bicycle gear mechanism. A disadvantage of this system is the axially large design and the comparatively small number of fourteen implementable gearspeeds.

In addition, WO 2008/089932 A1 discloses a transmission unit for bicycles, in which transmission units a large number of gearspeeds can be implemented by means of two countershafts and a further partial transmission by multiplying the individual gearspeeds of the two partial transmissions, and at the same time a compact design can be implemented. A disadvantage with this transmission unit is that, in order to shift the idler gears, a camshaft is displaced axially and the transmission therefore requires a large amount of space in the axial direction.

BRIEF SUMMARY OF THE INVENTION

The object of the present invention is therefore to provide an improved transmission unit, an improved shifting device and an improved transmission housing for a vehicle operated by muscle force, as a result of which a more compact design and a large number of gearspeeds accompanied by a reduced weight can be implemented.

According to a first aspect of the invention there is provided a shifting device for a transmission unit of a vehicle operated by muscle force, having a first shaft on which a plurality of idler gears is mounted, a corresponding number of gearwheels, which are mounted on at least one second shaft, wherein the idler gears can each be connected to the first shaft by means of shifting means, wherein the first shaft is formed as a hollow shaft and has two shifting pins which lie coaxially on the inside, wherein the shifting pins are each connected to drive means which are configured to rotate the shifting pins in order to actuate the shifting means.

According to a second aspect of the invention there is provided a transmission unit for a vehicle which is driven by muscle force, having an input shaft which can be connected on opposite sides to cranks for driving the vehicle, having a first partial transmission, wherein the first partial transmission has a countershaft, wherein a plurality of driving gearwheels is mounted on the input shaft, and wherein a corresponding plurality of driven gearwheels of the first partial transmission is mounted on the countershaft, wherein the driven gearwheels of the first partial transmission are formed as idler gears which can be connected rotationally fixed to the countershaft by means of shifting means, wherein the countershaft forms an input shaft of a second partial transmission, on which input shaft a plurality of second driving gears are mounted, wherein the second partial transmission has an output shaft on which a corresponding plurality of second driven gearwheels is mounted, wherein the second driving gears of the second partial transmission are formed as idler gears which can be connected rotationally fixed to the input shaft by means of shifting means, and wherein the output shaft of the second partial transmission is formed as a hollow shaft which is arranged coaxially with respect to the input shaft.

According to a third aspect of the invention there is provided a transmission unit for a vehicle driven by muscle force, having a first partial transmission, wherein the first partial transmission has an input shaft and a countershaft, wherein a plurality of driving gears is mounted on the input shaft, and wherein a corresponding plurality of driven gears is mounted on the countershaft, wherein the countershaft of the first partial transmission can be connected to an input shaft of a second partial transmission, on which input shaft a plurality of second driving gears is mounted, wherein the second partial transmission has an output shaft on which a corresponding plurality of driven gearwheels is mounted, and wherein the countershaft of the first partial transmission can be connected to the input shaft of the second partial transmission by means of at least one epicyclic transmission.

According to a fourth aspect of the invention there is provided a transmission housing for a transmission unit of a vehicle operated by muscle force, having a housing casing which forms a circumferential face of the transmission housing, and a transmission cage for mounting the transmission unit, which transmission cage has pins for axially connecting at least two bearing plates, wherein at least one of the bearing plates is formed in such a way that in the assembled state of the transmission housing it substantially closes off the housing casing at one axial end.

One advantage of the first aspect of the invention is that the shifting pins permit an axially compact design of the transmission unit because the shifting pins are rotated in order to actuate the shifting means in the second shaft.

One advantage of the second aspect of the transmission unit according to the invention is that a compact design and at the same time a large number of shiftable gearspeeds can be implemented because the two partial transmissions are connected one behind the other and have a common shaft on which gearwheels of both partial transmissions are mounted. In addition, the compact design is implemented by the output shaft which is arranged coaxially with respect to the through shaft, wherein the through shaft is used simultaneously as an input shaft of the first partial transmission, and the output shaft is used simultaneously as an output shaft of the second partial transmission.

An advantage of the third aspect of the transmission unit according to the invention is that by virtue of a simple epicyclic transmission requiring little space, a further partial transmission for the transmission unit can be implemented and as a result the number of gearspeeds which can be implemented is at least doubled.

An advantage of the fourth aspect of the transmission unit according to the invention is that at least one of the bearing plates serves simultaneously as a housing cover and closes off the transmission housing axially. As a result, it is possible to dispense with at least one transmission housing cover, as a result of which the weight of the transmission unit can be advantageously reduced and the installation space made smaller.

In the first aspect of the invention it is preferred if the drive means are configured to rotate the corresponding shifting pin synchronously with respect to the first shaft in order to maintain a shifted state and to rotate the shifting pin in relation to the first shaft in order to carry out a gear change.

As a result, the shifting pin can actuate the shifting means by a relative movement, and individual idler gears can be connected rotationally fixed to the first shaft.

In addition it is advantageous if the two shifting pins can be rotated independently of one another. As a result, the idler gears can be shifted independently of one another, as a result of which a large number of gearspeeds can be implemented.

Furthermore, it is advantageous if the drive means each have a rotational speed super-imposition transmission.

As a result, the shifting pin can rotate synchronously with the first shaft, and a second rotational movement can easily be superimposed.

It is advantageous here if the rotational speed super-imposition transmission is formed as a planetary gear mechanism.

As a result, a simple and compact design of the rotational speed super-imposition mechanism is possible.

The planetary gear mechanism is preferably formed as a stepped planetary gear mechanism. As a result, a particularly compact design is possible.

It is preferred here if the first shaft is connected rotationally fixed to a sun gear of the planetary gear mechanism, and the shifting pin is connected rotationally fixed to a planetary carrier of the planetary gear mechanism.

As a result, the rotation of the first shaft can be transmitted with little expenditure to the shifting pin.

It is also advantageous if rotation of a ring gear of the planetary gear mechanism can be transmitted as rotation of the shifting pin in relation to the shaft.

As a result, a rotation in relation to the shaft can be transmitted to the shifting pin with simple mechanical means.

In general it is preferred if the rotation of the first shaft can be transmitted to the sun gear of the planetary gear mechanism by means of a constant gear set.

Furthermore, it is preferred if the rotation of the planetary carrier of the planetary gear mechanism can be transmitted to the shifting pin by means of a constant gear set.

As a result of this arrangement, the complicated relative rotation of the shifting pin in the first shaft can be implemented with mechanically simple means. The constant gear sets and the planetary gear mechanism are preferably configured in such a way that the shifting pin and the first shaft rotate at the same rotational speed if the ring gear of the planetary gear mechanism is secured or held in relation to the transmission housing.

The rotational movement of the ring gear is preferably carried out by means of a tension disk. The tension disk is preferably actuated by means of a Bowden cable. The tension disk translates the tensile movement carried out by the Bowden cable in a rotational movement of the ring gear.

The shifting means are preferably formed as shiftable freewheels.

As a result, the idler gears can be mounted on the first shaft in such a way that they can be shifted with simple and compact shifting means.

It is preferred here if the freewheels have shifting pawls which can be engaged with an internal toothing of the idler gears.

As a result, it is possible to implement freewheels which can easily be activated and which can take up a large torque because they transmit force in the tangential direction from the idler gear to the first shaft.

In addition it is preferred if the shifting pin has actuation portions by means of which the freewheels can be actuated.

As a result, the freewheels can be engaged with the idler gears by means of a structurally simple measure.

It is preferred here if the actuation portions are formed as recesses in the shifting pin.

As a result, actuation portions of the shifting pawls can pivot out in the inward direction, with the result that the actual shifting pawl pivots radially outward and can be engaged with the internal toothing of the idler gears. As a result, a shaft with a small diameter can be implemented.

Alternatively it is preferred if the actuation portions are of proud design.

As a result, the shifting pawls can be pressed directly radially outward, and it is possible to dispense with pretensioning devices such as, for example, springs.

Furthermore it is preferred if the actuation portions are arranged on the shifting pin in such a way that the freewheels of two successive gear stages can be activated simultaneously.

As a result it is possible to implement a power shift transmission because the freewheel of the relatively high gearspeed is engaged with the corresponding idler gear, while the freewheel of the relatively low gearspeed freewheels.

Furthermore it is preferred if a plurality of freewheeling pawls is assigned to each idler gear.

As a result, a relatively high torque can be transmitted from the idler gear to the shaft, and there is no risk of injury in the case of a fracture in a freewheeling pawl because at least one further freewheeling pawl can transmit the torque for a brief time.

Furthermore, it is preferred if the freewheeling pawls of a freewheel are distributed over the circumference of the shaft in such a way that just one of the freewheeling pawls can be engaged simultaneously with the idler gear.

As a result, the rotational angle of the shiftable idler gear decreases until the shifting pawl engages in the internal toothing, which improves the traveling comfort.

Furthermore it is preferred if the actuation portions are formed in such a way that only correspondingly shaped freewheels can be actuated.

As a result, specific actuation portions can only actuate specific freewheels, as a result of which a relatively large number of different freewheels can be actuated by means of one shifting pin.

Generally it is preferred if the shifting pin is of axially displaceable design.

As a result, the useable rotational range of the shifting pin can be enlarged.

Alternatively it is preferred that the drive means have an electric actuator.

As a result, it is possible to dispense with gearwheels for driving the shifting pin, as a result of which the weight can be reduced further.

In this context it is preferred if a stator of the electric actuator is connected rotationally fixed to the first shaft.

As a result, it is possible to dispense with additional rotational means in order to rotate the electric actuator synchronously with the first shaft.

In this context it is preferred if the electric actuator is arranged in the first shaft.

This makes a compact design of the transmission unit possible.

Furthermore it is preferred if the electric actuator is formed as an electric motor and particularly preferably as a stepping motor.

As a result, a relative movement of the shifting pin with respect to the second shaft can be implemented with a simple controller.

Alternatively it is preferred if the drive means have a hydraulic actuator.

As a result, the shifting pin can be actuated without additional electrical energy having to be made available.

In this context it is preferred if the hydraulic actuator has a hydraulic master which is connected rotationally fixed to a transmission cage.

As a result, hydraulic pressure can be fed to the hydraulic actuator without complex rotational feedthroughs.

In addition it is preferred if the hydraulic actuator has a hydraulic slave which is mounted so as to be capable of rotating in relation to the hydraulic master.

As a result, the hydraulic pressure can easily be transmitted to rotating components.

In this context it is preferred if the hydraulic slave has a first slave component which is connected rotationally fixed to the first shaft.

As a result, part of the hydraulic slave can be supported on the first shaft and can rotate the shifting pin with the rotational speed of the first shaft.

Furthermore it is preferred if the hydraulic slave has a second slave component which is connected rotationally fixed to the shifting pin.

As a result, the second slave component can transmit a rotational movement of the shifting pin in relation to the first shaft.

Furthermore, it is preferred if the first and second slave components form at least one slave cylinder, and wherein the second slave component forms at least one slave piston.

As a result, hydraulic pressure, which is built up in the slave cylinder, can actuate the slave piston and can bring about a relative rotation of the shifting pin in relation to the second shaft.

It is preferred here if the slave piston is mounted so as to be moveable in a circumferential direction.

As a result, no further mechanical means are necessary to translate the movement of the slave piston into a rotational movement.

Furthermore it is preferred if the slave cylinder is formed as a double-acting cylinder.

As a result, by simply reversing the applied hydraulic pressure it is possible to reverse the rotational direction of the slave piston.

Furthermore it is preferred if the first slave component and the second slave component form at least two slave pistons.

As a result, a greater force can be applied to the shifting pin.

It is preferred here if the two slave cylinders form a series circuit. It is possible that at first one piston is actuated and moves the shifting pin into a first rotational position, and then the second slave piston is activated by increasing the hydraulic pressure further, in order to rotate the shifting pin into a second rotational position. In addition, the useable rotational range of the shifting pin can be enlarged.

Furthermore it is preferred if the shifting pin has a latching device which secures the shifting pin in different rotational positions in the first shaft.

As a result it is possible to implement in a reproducible fashion a precise rotational position of the shifting pin in the first shaft, which position has to be released by an increased application of force.

Furthermore, it is preferred if the shifting pin is mounted so as to be axially moveable in relation to the second slave component.

As a result, a further shifting function can be implemented by means of axial movement of the shifting pin.

In addition it is preferred if the shifting pin has an actuation portion by means of which a clutch of a separate partial transmission can be actuated.

As a result, two transmissions which are connected in series can be shifted with one shifting pin, which improves the shifting comfort.

In the third aspect of the invention it is preferred if the countershaft of the first partial transmission can be connected rotationally fixed to the input shaft of the second partial transmission by means of a clutch at least in one rotational direction.

As a result, the first gear stage of the epicyclic transmission can be implemented with simple mechanical means.

Furthermore, it is preferred if the countershaft of the first partial transmission and the input shaft of the second partial transmission are arranged coaxially with respect to one another.

As a result, it is possible to transmit force from the countershaft to the input shaft of the second partial transmission with low structural complexity.

In this context it is also advantageous if the countershaft of the first partial transmission can be connected rotationally fixed to a planetary gear set of the epicyclic transmission.

As a result, a further gear stage can be implemented with structurally simple means.

Furthermore it is preferred if a ring gear of the epicyclic transmission can be connected rotationally fixed to the input shaft of the second partial transmission.

As a result, an output of the planetary gear mechanism can be implemented with simple means.

Furthermore, it is preferred if a sun gear of the epicyclic transmission can be connected rotationally fixed to a transmission housing of the transmission unit by means of a clutch.

As a result, a further gearspeed of the epicyclic transmission can be implemented with simple structural means.

Furthermore it is preferred if the input shaft of the first partial transmission is formed as a through shaft which can be connected on opposite sides to cranks for driving the vehicle.

As a result, it is possible to dispense with further gearwheels which transmit the input torque of the transmission unit to the input shaft of the first partial transmission.

Furthermore it is preferred if the output shaft is formed as a hollow shaft which is arranged coaxially with respect to the through shaft.

As a result, a compact design is possible and as a result the sprocket can be arranged in a compact design coaxially with respect to the bottom bracket of the bicycle.

Furthermore it is preferred if the epicyclic transmission rotates about a rotational axis which is arranged offset in parallel with the input shaft.

As a result, an axially compact design of the transmission unit can be implemented.

It is generally preferred if the input shaft can be connected rotationally fixed to the output shaft by means of a clutch at least in one rotational direction. As a result, a further gearspeed of the transmission unit can be implemented as a direct gearspeed with simple means.

Furthermore it is preferred if the second driving gears of the second partial transmission are formed as idler gears which can be connected rotationally fixed to the input shaft by means of shifting means.

As a result, the second partial transmission can be shifted with low structural complexity if the countershaft is not connected at its axial ends to drive means, for example foot pedals.

In addition, in the third aspect of the invention it is preferred if the driven gearwheels of the first partial transmission are formed as idler gears which can be connected rotationally fixed to the countershaft by means of shifting means.

As a result, the first partial transmission can be shifted with low structural complexity because the axial ends of the countershaft are accessible and are not connected to drive means, for example foot pedals.

It is generally preferred to combine one of the transmission units according to the invention with the shifting device according to the invention. This makes it possible to implement a bicycle gear mechanism which is compact overall.

Of course, the features which are mentioned above and the features which will be explained below can be used not only in the respectively specified combination but also in other combinations or alone without departing from the scope of the present invention.

BRIEF DESCRIPTION OF THE SEVERAL VIEWS OF THE DRAWINGS

Exemplary embodiments of the invention are illustrated in the drawing and will be explained in more detail in the following description. In the drawing:

FIG. 10 shows a perspective exploded illustration of a shaft for bearing shiftable idler gears with a rotating shifting pin;

FIG. 11 shows a perspective illustration of a shaft with shifting pawls and a rotatable shifting pin;

FIGS. 12A-F show basic outlines explaining shifting processes with a rotatable shifting pin;

FIG. 13 shows an exploded illustration of a shaft with a rotatable shifting pin and a planetary gear mechanism for rotating the shifting pin;

FIG. 14 shows a perspective illustration of the shaft and of the shifting device according to FIG. 13;

FIG. 15 shows an exploded illustration of a rotatable shifting pin with a clutch of the planetary gear mechanism;

FIG. 29 shows a circuit diagram of a shifting device with two rotatable shifting pins; and FIG. 30 shows an exploded illustration of the shifting device according to FIG. 29.

DETAILED DESCRIPTION OF THE INVENTION

Figure 1:
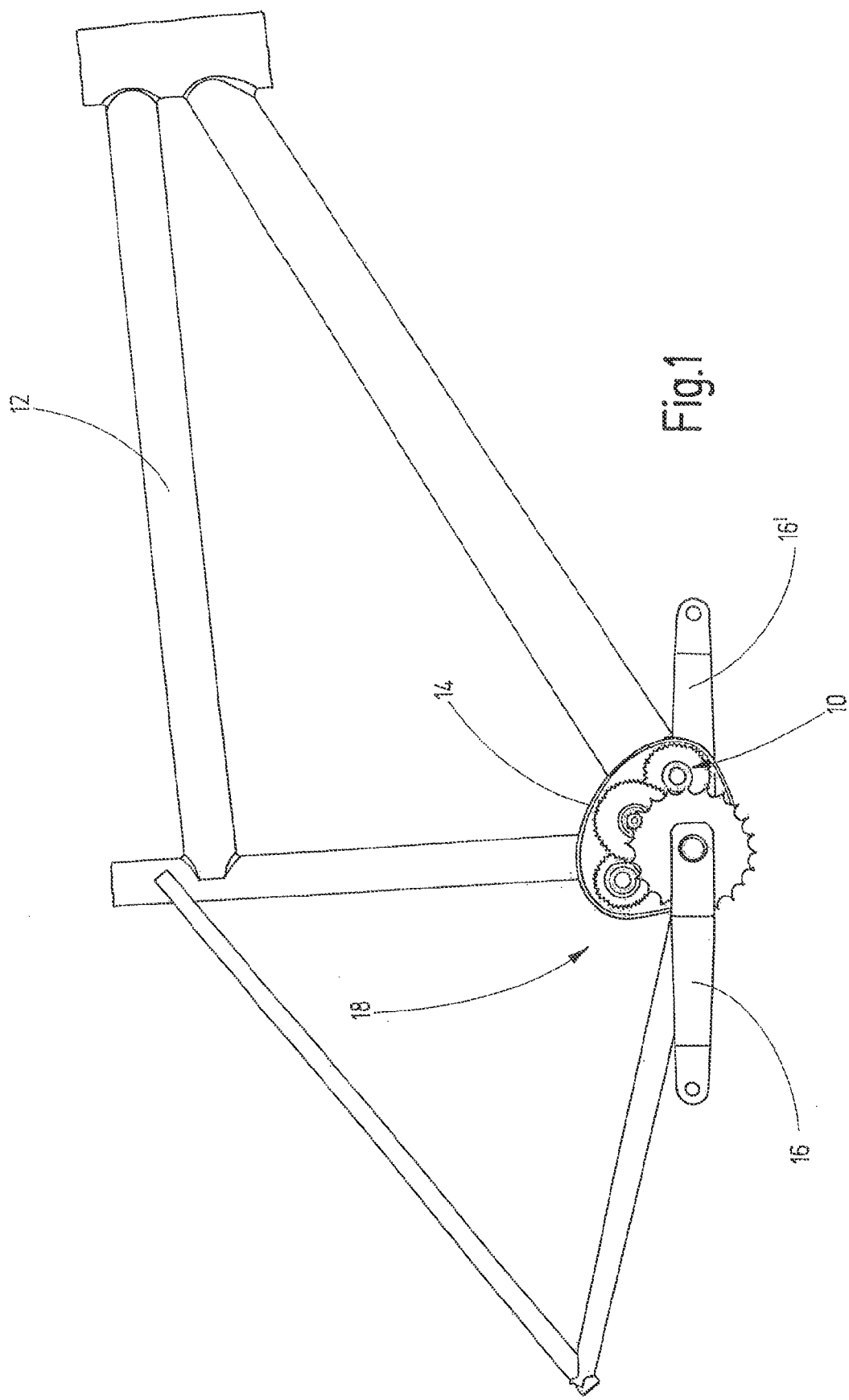
FIG. 1 shows a side view of a bicycle frame with a multi-gearspeed transmission.

In FIG. 1, a transmission unit is denoted generally by 10.

FIG. 1 shows a side view of a bicycle frame 12 which has a transmission housing 14 in which the transmission unit 10 is held. The transmission unit 10 is only indicated schematically in this illustration and is formed as a compact unit which is preferably arranged in a transmission cage (not illustrated here). The transmission unit 10 is described here by way of example for the use in a bicycle, but the use in other vehicles which are operated by muscle force is also possible. In addition, it is also conceivable to use the transmission unit 10 for vehicles in which muscle force is used in combination with a drive machine for driving the vehicle.

The transmission unit 10 and the transmission housing 14 form, together with foot pedals 16 and 16', a multi-gearspeed transmission 18.

Figure 2:
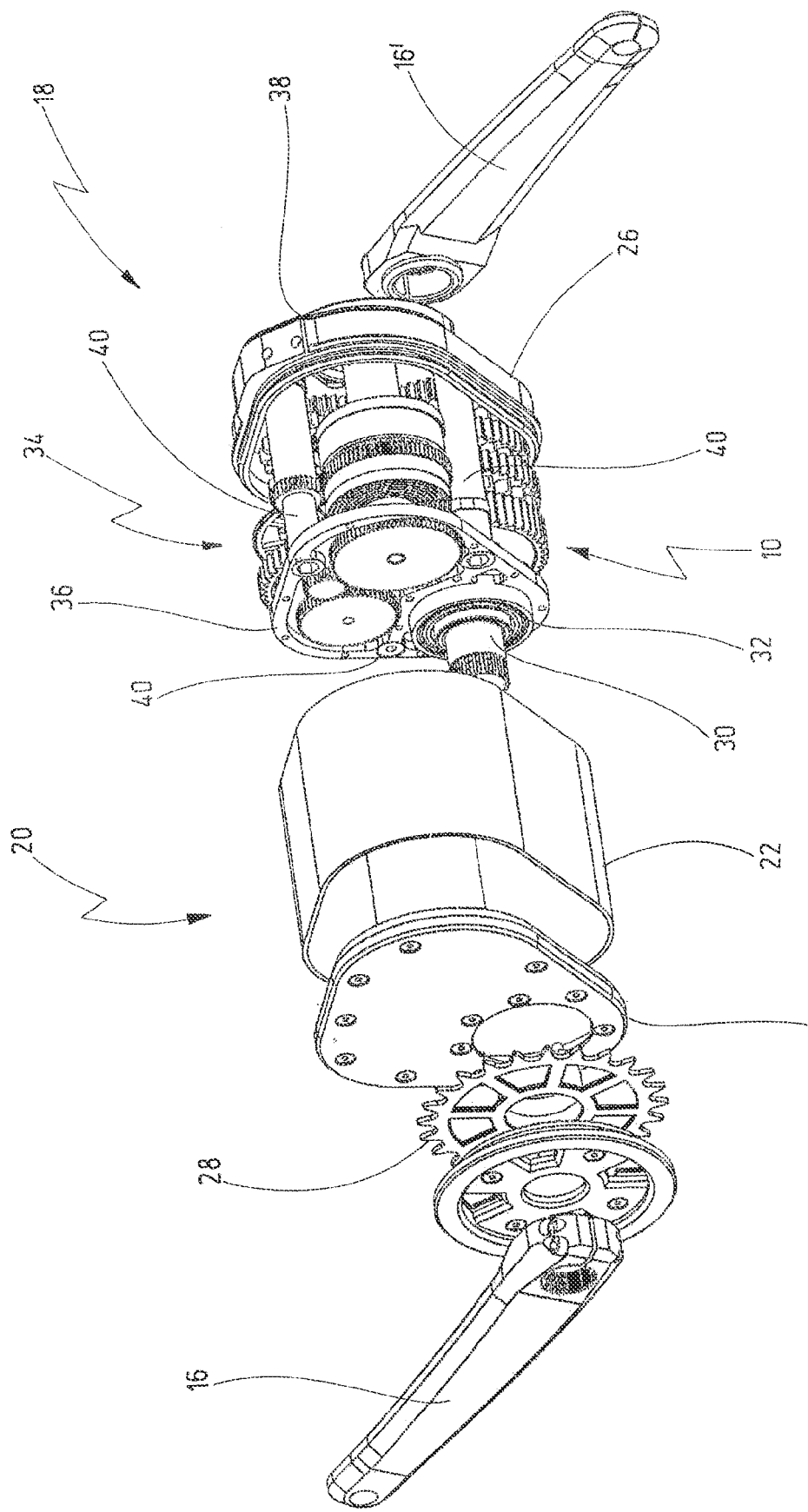
FIG. 2 shows an exploded illustration of a transmission housing with a multi-gearspeed transmission.

FIG. 2 shows an exploded illustration of the multi-gearspeed transmission 18. Identical components are provided with identical reference symbols, and in this respect reference is therefore made to the description relating to FIG. 1.

The multi-gearspeed transmission 18 has a transmission housing 20 which is formed by a housing casing 22 and two housing covers 24, 26, which close off the housing casing 22 at its axial ends. The multi-gearspeed transmission 18 also has a chainwheel 28, which transmits, by means of a chain (not illustrated), a torque, which is stepped up or stepped down by means of the transmission unit 10, to a rear wheel (not illustrated) of the bicycle.

The foot pedals 16, 16' can be connected to an input shaft 30 of the transmission unit 10 and form the torque input for the multi-gearspeed transmission 18. The chainwheel 28 is connected to an output shaft 32 of the transmission unit 10 and forms the output of the multi-gearspeed transmission 18. The input shaft 30 and the output shaft 32 are arranged coaxially with respect to one another.

A transmission cage 34 is preferably arranged in the transmission housing 20. The transmission cage 34 serves to hold a plurality of transmission shafts, bearings, shifting means, gearwheels and feed lines as well as other components of the multi-gearspeed transmission 18.

The transmission cage 20 preferably has two bearing plates 36, 38 which can be connected to one another by means of a multiplicity of pins 40. The bearing plates have bearings on which shafts are rotatably mounted. Gearwheels of the transmission unit 10 are mounted on the shafts.

Alternatively, the pins 40 and the shafts of the transmission unit 10 can be mounted on the housing covers 24, 26, and it is therefore possible to dispense with separate bearing plates 36, 38 in order to safe weight and space.

Figure 3:
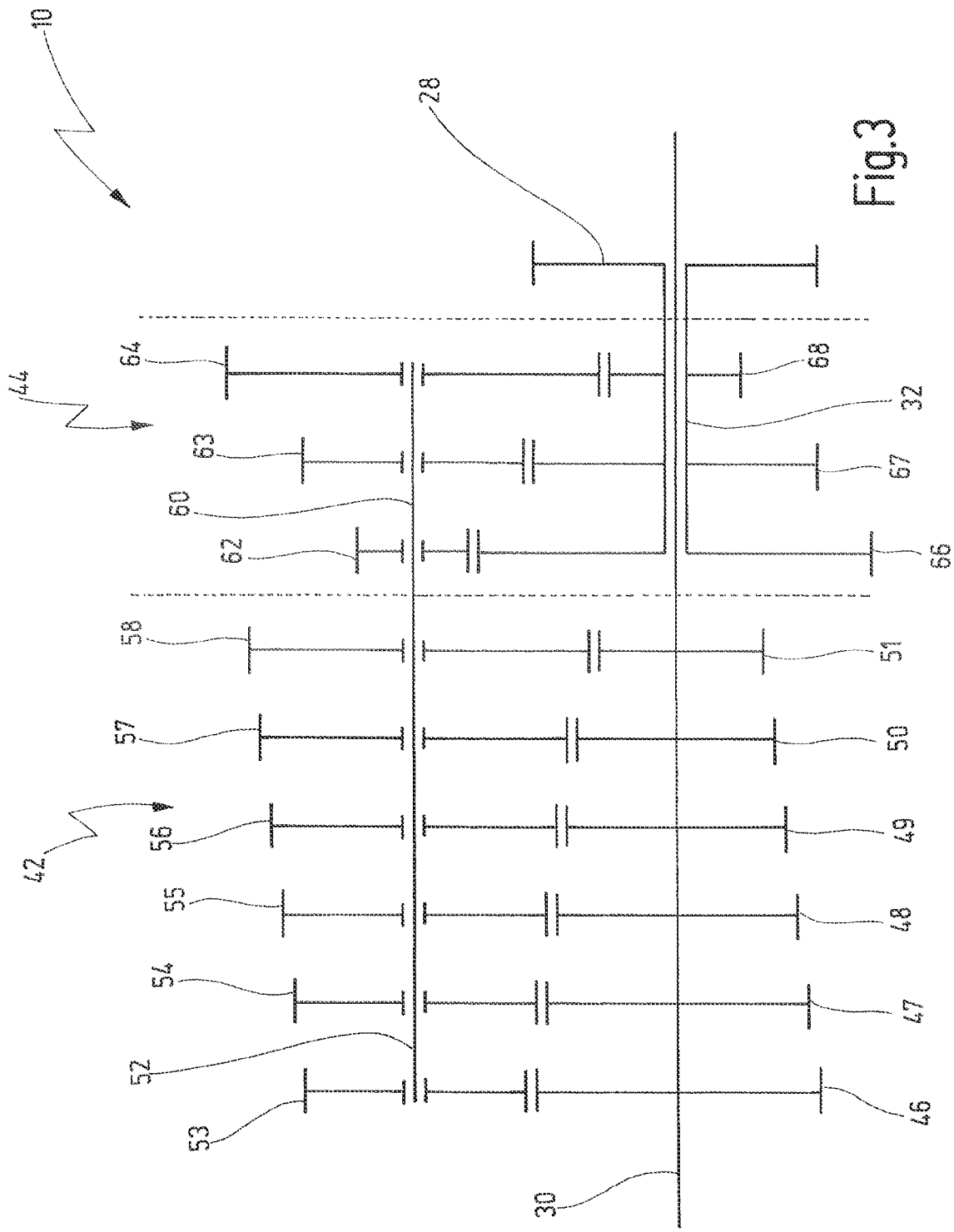
FIG. 3 shows a shifting diagram of a multi-gearspeed transmission with two partial transmissions and a common countershaft.

FIG. 3 shows a circuit diagram of the transmission unit 10.

The transmission unit 10 has the input shaft 30 and the output shaft 32. The input shaft 30 is formed as a through shaft. The output shaft 32 is formed as a hollow shaft. The input shaft 30 and the output shaft 32 are arranged coaxially with respect to one another. The output shaft 32 is connected in a rotationally fixed fashion to the chainwheel 28 which forms an output element of the transmission unit 10.

The transmission unit 10 has a first partial transmission 42 and a second partial transmission 44. A multiplicity of driving gears 46, 47, 48, 49, 50, 51 are mounted on the input shaft 30. The first partial transmission 42 has a countershaft 52. Driven gears 53, 54, 55, 56, 57, 58 are mounted on the countershaft 52. The driven gears 53, 54, 55, 56, 57, 58 are formed as idler gears.

The driven gears 53 to 58 can be connected to the countershaft 52 by means of shifting means (not illustrated). The driven gears 53 to 58 and the driving gears 46 to 51 form gear pairs which have different transmission ratios, and by selective connection of the driven gears 53 to 58 to the countershaft 52 it is therefore possible to implement different gear stages.

The second partial transmission 44 has an input shaft 60. Driving gears 62, 63, 64 are mounted on the input shaft 60. The driving gears 62, 63, 64 are formed as idler gears. The driving gears 62, 63, 64 can be connected in a rotationally fixed fashion to the input shaft 60 by means of shifting means. The driven gears 66, 67, 68 are mounted on the output shaft 32. The driven gears 66, 67, 68 are in meshing engagement with the driving gears 62, 63, 64.

By means of the driven gears 66, 67, 68 and driving gears 62, 63, 64 which mesh with one another, gear pairs are formed which have different transmission ratios. The driving gears 62, 63, 64 can be connected in a rotationally fixed fashion to the input shaft 60 by means of shifting means (not illustrated), as a result of which different selectable gear stages of the second partial transmission 44 are formed.

The countershaft 52 of the first partial transmission 42 is connected in a rotationally fixed fashion to the input shaft of the second partial transmission 44. The countershaft 52 is preferably formed in one piece with the input shaft 60.

By virtue of the fact that the first partial transmission 42 is connected to the second partial transmission 44, the possible gear stages which can be implemented in the first partial transmission 42 are multiplied by the gear stages of the second partial transmission 44. As a result, eighteen gearspeeds can be implemented by means of the transmission unit 10 which is illustrated in FIG. 3.

Furthermore, it is conceivable that the input shaft 30 can be connected in a rotationally fixed fashion to the output shaft 32 by means of a clutch (not illustrated). As a result, a further gearspeed could be implemented as a direct gearspeed.

Figure 4:
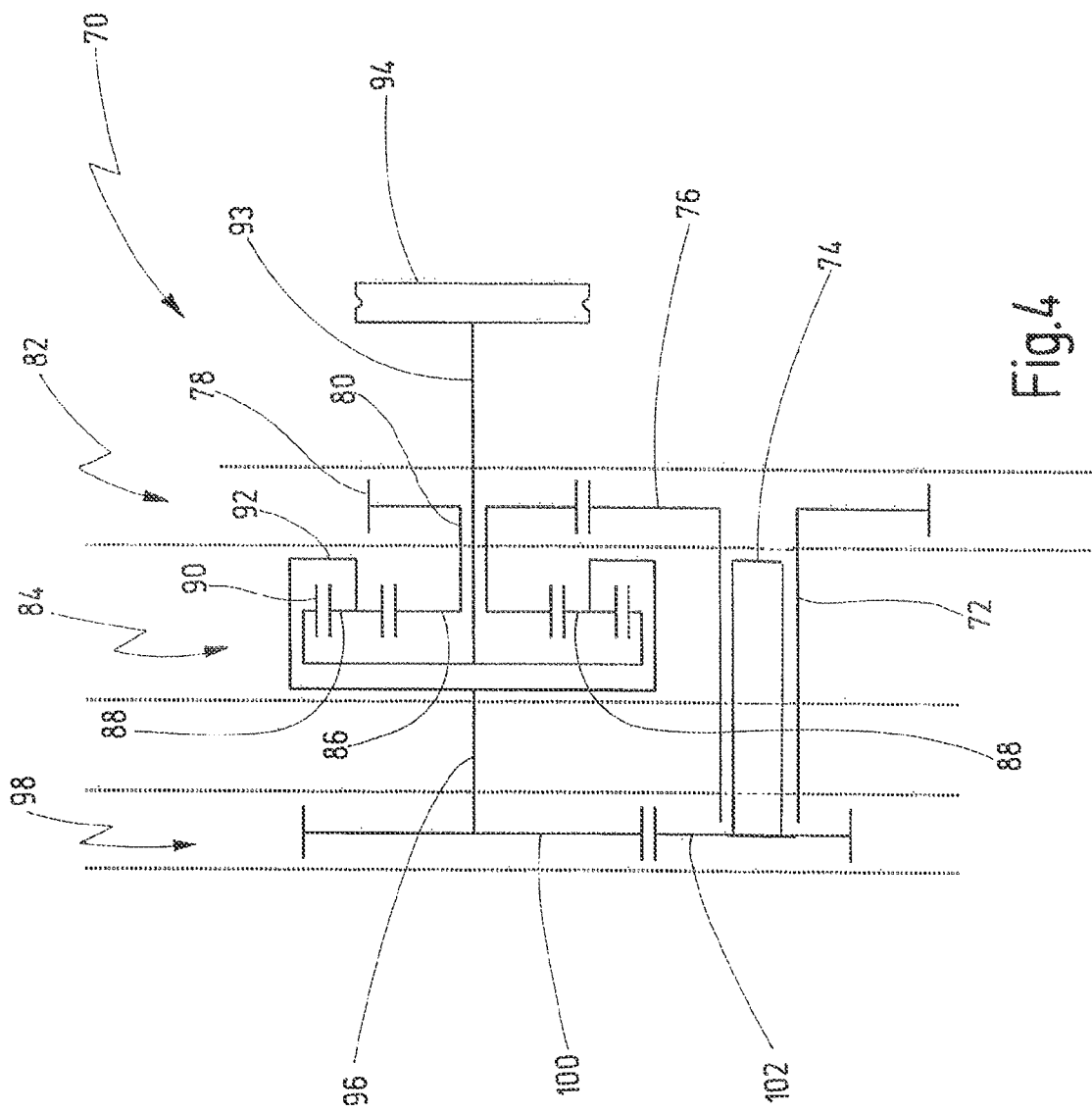
FIG. 4 shows a shifting diagram of a shifting device with a rotatable shifting pin.

In FIG. 4 a shifting device for rotating a rotatable shifting pin is denoted generally by 70. The shifting device 70 serves to connect in a rotationally fixed fashion idler gears (not illustrated), mounted on a shaft 72, to the shaft 72 by means of shifting means (not illustrated). The shifting device 70 has a shifting pin 74 which is mounted so as to be rotatable in a coaxial fashion in the shaft 72 which is formed as a hollow shaft. The shifting pin 74 is formed in such a way that specific shifting means are activated in a specific rotational position in relation to the shaft 72, with the result that at least one of the idler gears is connected in a rotationally fixed fashion to the shaft 72 at least in one rotational direction. The shifting device 70 which is illustrated in FIG. 4 serves generally either to maintain the rotational position of the shifting pin 74 in relation to the rotating shaft 72, in order to maintain the engaged gear stage, or serves to change the rotational position in a targeted fashion in order to change the gear stage.

The shaft 72 is connected in a rotationally fixed fashion to a driving gear 76. The driving gear 76 is connected in a rotationally fixed fashion to a driven gear 78 which is mounted on a secondary shaft 80. The driving gear 76 and the driven gear 78 form a first transmission gear 82.

The shifting device 70 also has a variable-ratio epicyclic transmission 84 or a summing gear mechanism 84, which is preferably formed as a planetary gear mechanism 84. The planetary gear mechanism 84 has a sun gear 86, planetary gears 88 and a ring gear 90. The sun gear 86 is connected in a rotationally fixed fashion to the driven gear 78 of the epicyclic transmission 82. The planetary gears 88 are mounted by means of a planetary carrier 92. The planetary gears 88 mesh with an internal toothing of the ring gear 90 and with an external toothing of the sun gear 86. The ring gear is connected in a rotationally fixed fashion to a ring gear shaft 93. The ring gear shaft 93 is connected to a tension disk 94. The planetary carrier 92 is rotatably mounted and connected in a rotationally fixed fashion to an output shaft 96. The secondary shaft 80 and the output shaft 96 are arranged coaxially with respect to one another. The sun gear 86 and the ring gear 90 are arranged coaxially with respect to the secondary shaft 80. The secondary shaft 80 is arranged offset in parallel with the shaft 72. The ring gear shaft 93 is arranged coaxially with respect to the secondary shaft 80. The ring gear shaft 93 can alternatively also be arranged offset in parallel with the secondary shaft 80 and can mesh with an external toothing of the ring gear 90.

The output shaft 96 is connected in a rotationally fixed fashion to the shifting pin 74 via a second transmission gear 98. The epicyclic transmission 98 has a constant gear set, which is formed by a driving gear 100 and a driven gear 102. The driving gear 100 is mounted in a rotationally fixed fashion on the output shaft 96, and the driven gear 102 is connected in a rotationally fixed fashion to the shifting pin 74.

The transmission ratio of the first transmission gear 82, of the planetary gear mechanism 84 and of the second transmission gear 98 is selected such that an overall transmission ratio of these three partial transmissions which are connected in series of one is obtained if the ring gear is secured or held in relation to the transmission housing. In such a state, the shifting pin 74 rotates at the same rotational speed as the shaft 72 by virtue of the selected transmission ratio. Accordingly, the shifting pin 74 does not carry out any relative rotation with respect to the shaft 72. A set shifted state is therefore maintained by virtue of the particular embodiment of the shifting pin 74 and of the shifting means.

If the ring gear 90 is rotated, this rotation of the ring gear is transmitted as a rotation of the shifting pin 74 in relation to the shaft 72. Depending on the rotational direction of the ring gear 90, the shifting pin 74 is rotated at a rotational speed which is faster or slower than the shaft 72. If the ring gear 90 is secured again in relation to the transmission housing, the shifting pin 74 rotates at the same rotational speed as the shaft 72. As a result, a rotation of the ring gear 90 through a specific rotational angle can bring about a rotation of the shifting pin 74 through a specific rotational angle in relation to the shaft 72.

The ring gear 90 is connected to the tension disk 94 via the ring gear shaft 93. The tension disk 94 is preferably connected to a Bowden cable (not illustrated) and transmits a pulling movement of the Bowden cable into a rotational movement of the ring gear shaft 93. As a result of actuation of the Bowden cable, the shifting pin 74 can rotate in relation to the shaft 72 in order to bring about a specific rotational position of the shifting pin in relation to the shaft 72.

The transmission gears 82, 98 can alternatively also be formed as chains, belts or toothed belts.

The tension disk 94 is preferably pre-loaded with a spring or a return spring (not illustrated). The spring is formed in such a way that when shifting in the direction of low gearspeeds it is tensioned. When shifting up, the ring gear is actuated by the spring and/or rotated. As a result, shifting up without application of force is possible. In the case of shifting down, the spring is tensioned by the force which is transmitted via the Bowden cable.

Alternatively, the tension disk 94 can also be formed without a spring. The shifting movement is then carried out by means of two Bowden cables. In this context, a first of the Bowden cables rotates the ring gear in a first direction, and a second of the Bowden cables rotates the ring gear in the second direction, in order to shift up or shift down.

Figure 5:
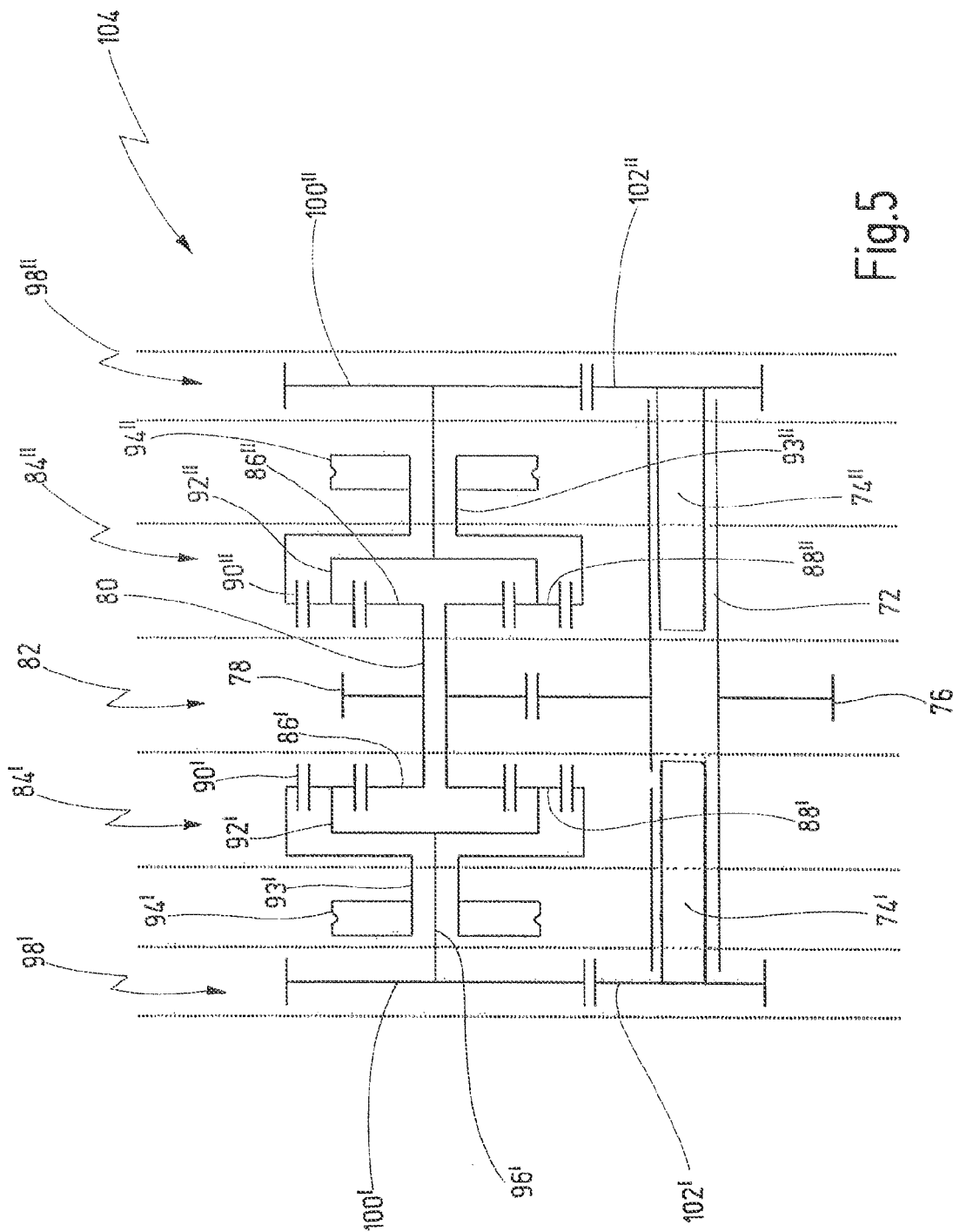
FIG. 5 shows a shifting diagram of a shifting device with two rotatable shifting pins.

FIG. 5 is a circuit diagram of a shifting device according to the principle of the shifting device 70 in FIG. 4. The shifting device in FIG. 5 is generally denoted by 104. Identical elements are denoted by identical reference numbers, only the differences being explained here.

In principle, the shifting device 104 is identical to the shifting device 70 from FIG. 4, wherein the shifting device 104 is configured to rotate two rotatable shifting pins in the shaft 72 independently of one another.

Shifting pins 74' and 74" are arranged in the shaft 72. The shaft 72 is connected via the first transmission gear 82 to a secondary shaft 80. The secondary shaft 80 is connected to the shifting pin 74' via a planetary gear mechanism 84 and a second transmission gear 98', wherein the functional principle is identical to that of the shifting device 70 from FIG. 4.

In contrast to the shifting device 70, the secondary shaft 80 is additionally connected to a planetary gear mechanism 84". The planetary gear mechanism 84" is preferably identical to the planetary gear mechanism 84'. The planetary gear mechanism 84" is connected to the shifting pin 74" via a second transmission gear 98". As in the shifting device 70, the transmission ratios from the shaft 72 to the shifting pin 74' and to the shifting pin 74" are just one, provided that corresponding ring gears 90' and 90" are secured in relation to the transmission housing.

The ring gears 90', 90" can each be actuated by means of a tension disk 94', 94" via ring gear shafts 93', 93". The two rotatable shifting pins 74', 74" can be rotated in relation to the shaft 72 by means of the shifting device 104, and shifting means (not illustrated) can therefore be activated independently of one another.

The shifting device 104 can be used, for example, to connect the idler gears of the partial transmissions 42 and 44 in FIG. 3 in a rotationally fixed fashion independently of one another to the corresponding shafts in order to form two partial transmissions which are connected in series.

Figure 6:
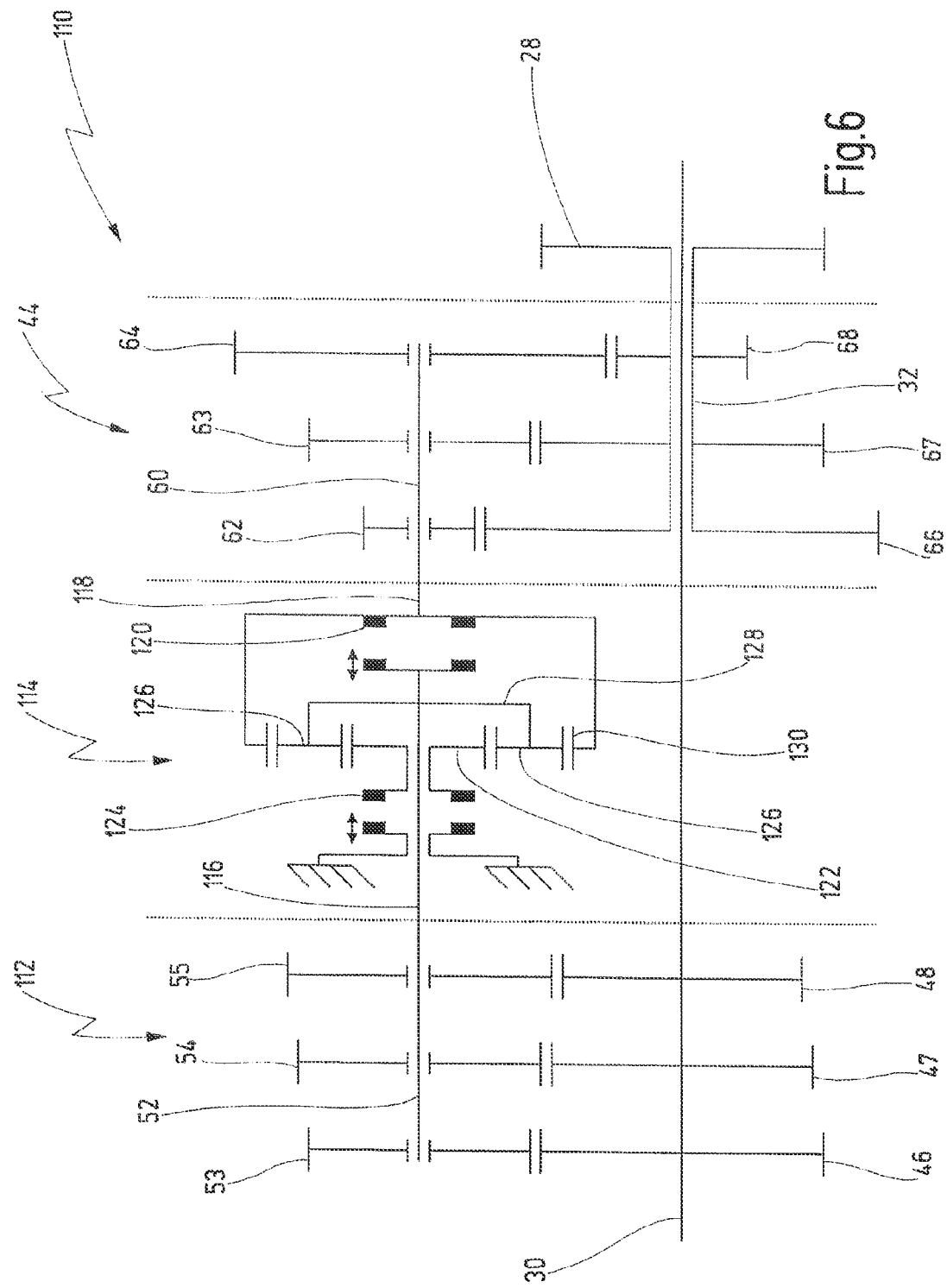
FIG. 6 shows a shifting diagram of a transmission unit with a planetary gear mechanism.

In FIG. 6, a circuit diagram of a transmission unit with three partial transmissions which are connected in series is illustrated and is denoted generally by 110.

The transmission unit 110 is to a certain extent identical to the transmission unit 10 from FIG. 3. Identical elements are denoted by identical reference numbers, with only the differences being explained here.

The input shaft 30 forms the input shaft of a first partial transmission 112. The first partial transmission 112 is essentially identical to the first partial transmission 42 from FIG. 3, with the first partial transmission 112 only having three different gear sets.

The countershaft 52 of the first partial transmission 112 is connected to an epicyclic transmission or a planetary gear mechanism 114. The countershaft 52 is connected in a rotationally fixed fashion to an input shaft 116 of the planetary gear mechanism 114. The countershaft 52 is more preferably formed in one piece with the input shaft 116. An output shaft 118 of the planetary gear mechanism 114 is connected in a rotationally fixed fashion to the input shaft 60 of the second partial transmission 44. The output shaft 118 is preferably formed in one piece with the input shaft 60. The planetary gear mechanism 114 has a first clutch 120 by means of which the input shaft 116 can be connected in a rotationally fixed fashion to the output shaft 118. The clutch 120 is preferably formed as a freewheel.

The planetary gear mechanism has a sun gear 122. The sun gear 122 can be connected in a rotationally fixed fashion to the transmission housing 40 by means of a second clutch 124. The planetary gear mechanism 114 also has planetary gears 126 which are mounted so as to be rotatable by means of a planetary carrier 128. The planetary carrier 128 can be connected in a rotationally fixed fashion to the input shaft 116. In addition, the planetary gear mechanism 114 has a ring gear 130 which can be connected in a rotationally fixed fashion to the output shaft 118.

Three different transmission ratios can be set between the input shaft 116 and the output shaft 118 of the planetary gear mechanism 114, and three gear stages can therefore be implemented. The first gear stage is formed by closing the first clutch 120, and opening the second clutch 124. As a result, the input shaft 116 is connected in a rotationally fixed fashion to the output shaft 118. The first transmission ratio is consequently equal to 1.

The second gear stage is formed by opening the first clutch 120 and closing the second clutch 124. As a result, the sun gear 122 is held tight and the rotating planetary carrier 128 drives the ring gear 130 which is connected to the output shaft 118. The second transmission ratio is consequently a step-up transmission ratio.

The third gear stage is formed in that the second clutch 124 is closed and the sun gear is therefore held tight. In addition, the input shaft 116 is connected to the ring gear 130 by means of a further clutch. In addition, the planetary carrier 128 is connected to the output shaft 118, and the planetary carrier 128 therefore forms the output of the planetary gear mechanism 114.

As a result, in each case three shiftable gear stages are formed by the partial transmissions 112 and 44 and by the planetary gear mechanism 114, and eighteen gear stages can be implemented by virtue of the fact that the three partial transmissions 112, 114, 44 are connected in series.

The partial transmissions 112, 44 are preferably shifted by means of the shifting device 104 in FIG. 5, wherein at least one of the shifting pins 74', 74" has shifting means which actuates at least one of the clutches 120, 124.

Of course, in the case of the transmission unit 110 in FIG. 6, the input shaft 30 can also be connected to the output shaft 32 by a clutch in order to form a gearspeed, which is the nineteenth in this case.

In order to increase the number of gearspeeds it is also conceivable to embody the planetary gear mechanism 114 as a multi-stage planetary gear mechanism.

Figure 7:
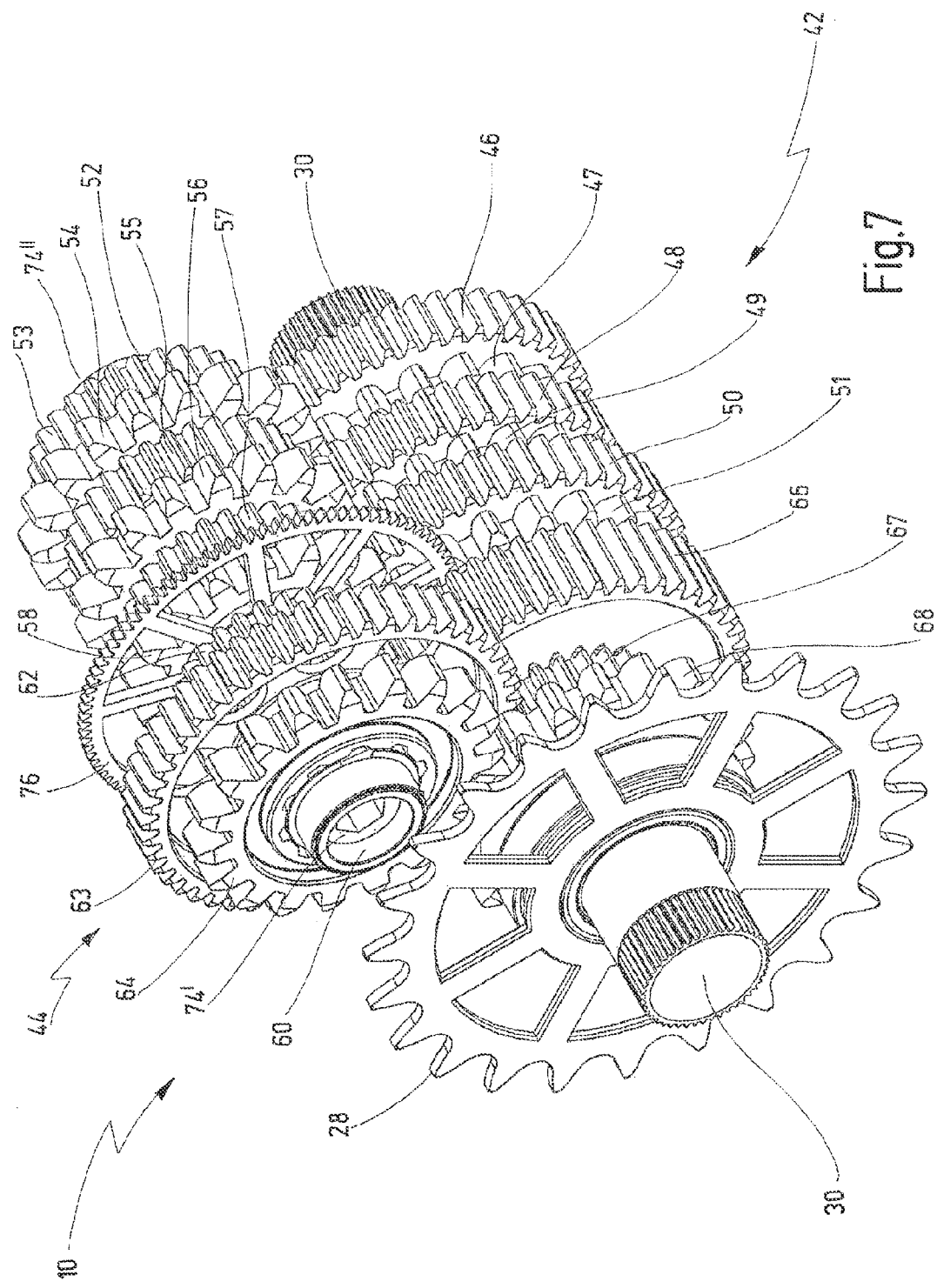
FIG. 7 shows a perspective illustration of an embodiment of a transmission unit with two partial transmissions and a common countershaft.

FIG. 7 shows a perspective illustration of the transmission unit 10. The transmission unit corresponds to the circuit diagram according to FIG. 3, with identical elements being denoted by identical reference numbers and only the differences being explained here.

The countershaft 52 of the first partial transmission 42 is formed in one piece with the input shaft 60 of the second partial transmission 44. The driven gears 53 to 58 and the driving gears 62 to 64 are formed as idler gears and can be shifted by means of the shifting pins 74' and 74". In addition, the driving gear 76 is mounted on the shaft 52 or 60 in order to drive the shifting pins 74' and 74" via the shifting device 104 (not illustrated).

Figure 8:
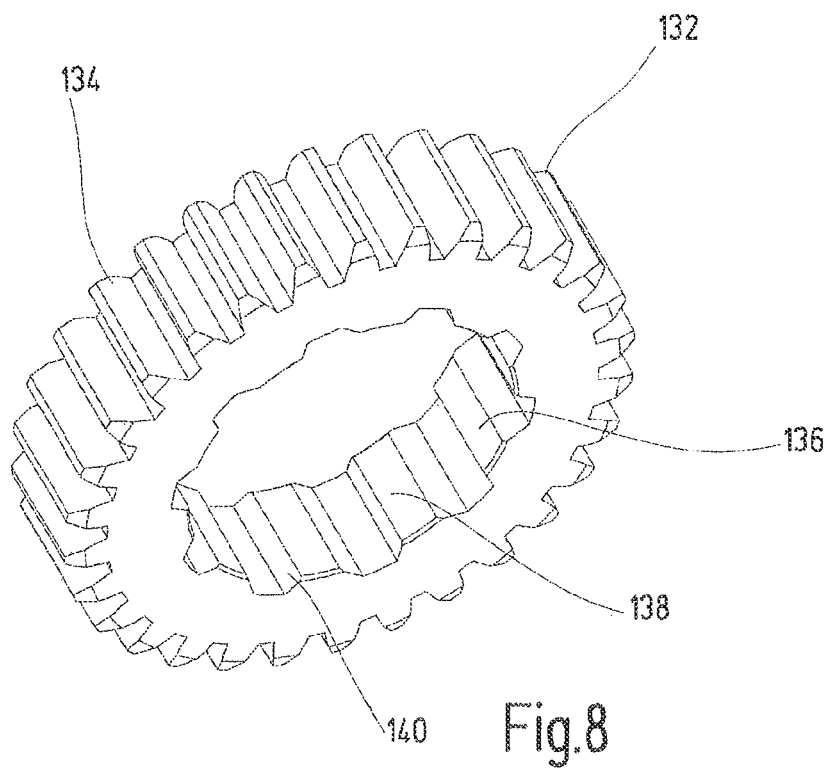
FIG. 8 shows a perspective illustration of an idler gear with internal toothing.

In FIG. 8 a shiftable idler gear with internal toothing is illustrated and is denoted generally by 132.

The idler gear 132 has an external toothing 134 and an internal toothing 136. The external toothing 134 is formed on the outer circumferential face. The internal toothing is formed on an inner circumferential face of the idler gear 132. The internal toothing 136 has sliding portions 138 and engagement portions 140. The sliding portions 138 are faces which are arranged in the circumferential direction of the idler gear 132. The engagement portions 140 are formed between the sliding portions 138, at an angle with respect to the sliding portions 138.

The external toothing 134 serves to mesh with other gearwheels. The internal toothing 136 serves to mount the idler gear 132 on a shaft and to connect it in a rotationally fixed fashion to the shaft by means of shifting means. In this context, the sliding portions 138 serve to mount the idler gear 132 on the shaft and to slide on the shaft. The engagement portions 140 serve to ensure that shifting means (which are not illustrated and which will be explained in more detail below) can be placed in engagement with the idler gear 132 and to connect the idler gear 132 in a rotationally fixed fashion to the shaft.

Figure 9:
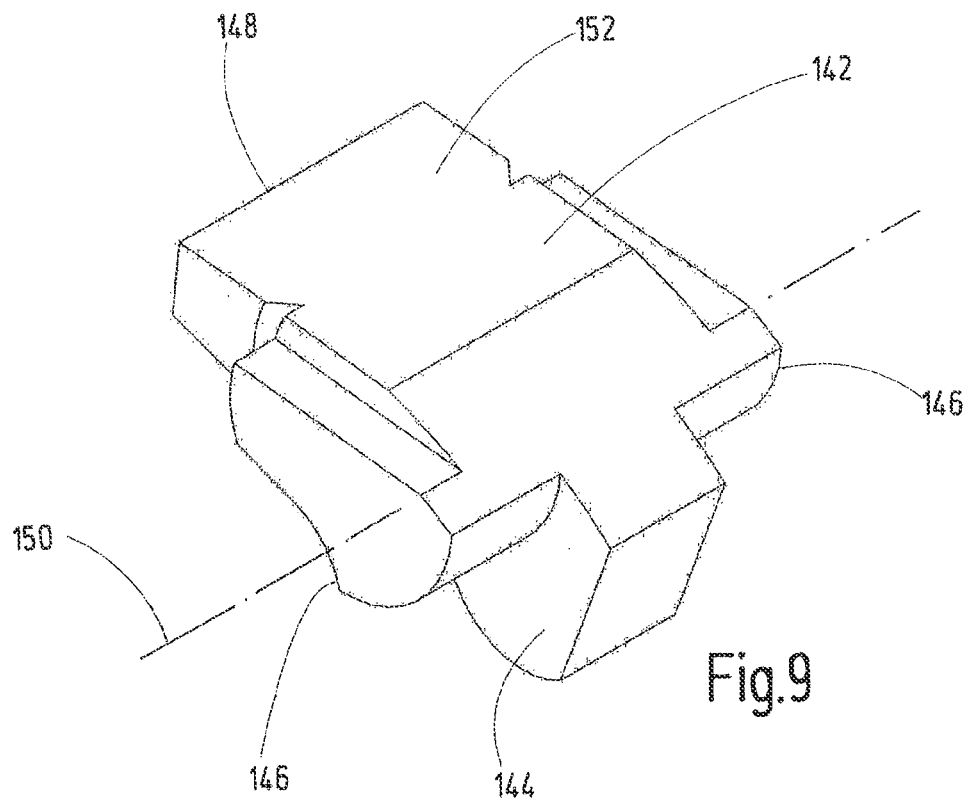
FIG. 9 shows a perspective illustration of a shifting pawl.

In FIG. 9 a freewheel body for connecting the idler gear 132 in a rotationally fixed fashion to a corresponding shaft is illustrated and denoted generally by 142. The freewheel body 142 has an actuation portion 144 which is formed on an underside of the freewheel body 142. The freewheel body 142 has a bearing portion 146 on each of its two lateral sections. The freewheel body 142 has an engagement portion 148. The engagement portion 148 is formed at an end of the freewheel body 142 lying opposite the actuation portion 144. The bearing sections 146 are formed on opposite sides of the freewheel body 142, specifically between the actuation portion 144 and the engagement portion 148.

The bearing portions 146 serve to mount the freewheel body 142 on a shaft in such a way that it can rotate or pivot about a rotational axis 150. In this context, the freewheel body 142 is attached to or mounted on the shaft in such a way that the actuation portion 144 points toward the inside of the shaft. In addition, the freewheel body 142 is prestressed by means of a spring element in such a way that in the unloaded state the actuation portion 144 is pivoted in the inward direction and the engagement section 148 is pivoted radially outward. The actuation portion 144 serves to be pressed radially outward by means of the shifting pin 74 in order to pivot the engagement portion 148 radially inward about the rotational axis 150.

If the engagement portion 148 is pivoted radially outward and protrudes with respect to the shaft, said engagement portion 148 can be placed in engagement with the engagement portion 140 of the internal toothing 136 of the idler gear 132 in one rotational direction of the idler gear 132, and the idler gear can therefore be connected in a rotationally fixed fashion to the shaft in the rotational direction.

The freewheel body 142 also has a sliding portion 152. The sliding portion 152 serves to pivot the freewheel body 142 radially inward if the idler gear is rotated in relation to the shaft in a direction which is opposed to the rotational direction, thereby serving as a freewheel.

The actuation portion 144 can have one or more grooves running perpendicular with respect to the rotational axis 150 or in the rotational direction of the shaft, in order to permit selective actuation. This is explained in more detail below.

FIG. 10 shows a shaft for mounting shiftable idler gears 132 and a shifting pin for shifting the freewheel bodies 142, in an exploded illustration. The shaft is generally denoted by 154 and the shifting pin by 156. The shaft 154 is designed as a hollow shaft to hold the shifting pin 156. The shaft 154 has bearing portions 158. Through holes 160 are formed in the region of the bearing portions 158. The shaft 154 has a first group 161 of bearing portions 158 which are formed axially one next to the other. In addition, the shaft 154 has a second group 163 of bearing portions 158 which are formed axially one next to the other. The first group 161 of the bearing portions 158 is arranged offset with respect to the second group 163 of bearing portions 158 in the circumferential direction. In each case two of the bearing portions 158 are arranged on opposite sides of the shaft 154.

The bearing portions 158 are formed in such a way that they can each hold one of the freewheel bodies 142. The through holes 160 serve to allow the actuation portion 144 to pivot through the through holes 160 and to be actuated by the shifting pin 156. The bearing portions 158 are formed in the shaft 154 in such a way that in a pivoted-in state the freewheel bodies 142 do not protrude with respect to the circumferential face of the shaft 154. In this pivoted-in state, the circumferential face of the shaft 154 and the sliding section 152 of the freewheel bodies 142 essentially form a plane.

A pin hole 162, through which a guide pin can be led, is also formed in the shaft 154.

The shifting pin 156 has actuation portions 164 which are formed over the circumference of the shifting pin 156. The actuation portions 164 are formed as recesses. The shifting pin 156 further has a circumferential groove 166. The groove 166 has two circumferential sections which are axially offset and are connected to one another by an oblique section 167. The actuation portions 164 are arranged axially offset and distributed over the circumference. The actuation portions 164 are arranged in part next to one another in the axial direction. The actuation portions 164 are arranged on opposite sides of the shifting pin 156, specifically in a way corresponding to the bearing portions 158 in the shaft 154.

The shifting pin 156 is formed in such a way that, depending on the rotational position of the shifting pin in the shaft 154, the actuation portions 164 are positioned on one of the through holes 160. As a result, the actuation portion 144 of the freewheel bodies 142 can pivot into the actuation portion 164 and therefore move the engagement section 148 into engagement with the internal toothing 136. The shifting pin 156 serves to actuate the freewheel bodies 142 of the first group 161 of bearing portions 158. In the inserted state of the shifting pin 156, the groove 166 is arranged in the region of the pin hole 162, with the result that the groove 166 can hold a pin (not illustrated) which is led through the pin hole 162. As a result, the shifting pin 156 is moved into different axial positions depending on the rotational position in the shaft 154.

This axial displacement of the shifting pin 156 serves to enlarge the useable rotational range of the shifting pin. The axial displacement has the effect that due to the axial position of some of the actuation portions 164 in relation to the actuation portions 144, said actuation portions 164 cannot activate the freewheel bodies 142. This means, conversely, that specific actuation portions 144 can be activated by specific freewheel bodies 142 in the second axial position. Consequently, as a result of the axial displacement of the shifting pin 156, some of the actuation portions 164 are not arranged under the actuation portions 144 and consequently cannot activate the freewheel bodies 142. As a result, when there are shifting pawls lying opposite one another an additional useable rotational range of 180° is produced for further shiftable gearwheels. It is also conceivable to enlarge the useable rotational range of the shifting pin 156 further by even further axial displacement.

A further possible way of extending the useable rotational range of the shifting pin is to have a different configuration of the actuation portions 144. By virtue of an asymmetrical configuration of the actuation portions 144 and corresponding actuation portions 164, only specific freewheel bodies 142 are actuated or only specific actuation portions 144 are pivoted into specific actuation sections 164 of the shifting pin 156. As a result, the useable rotational range of the shifting pin 156 can be extended from 180° to 360° even when there are freewheel bodies lying opposite one another.

For example, the actuation portions 144 of the freewheel pawls 142 can have one or more grooves running in the rotational direction of the shaft 154, with the result that actuation portions 144 which are configured in such a way can only pivot into correspondingly configured actuation portions 164. In this context, selective actuation can be made possible by means of the number and the position of such grooves.

FIG. 11 illustrates the shaft 154 with the inserted shifting pin 156 and the freewheel bodies 142. Identical elements are provided with identical reference numbers, with only the differences being presented here.

The shifting pin 156 is positioned in the shaft 154 in such a way that two of the freewheel bodies 142 are pivoted out, with just one being visible.

In addition, a second shifting pin (which is not illustrated or cannot be seen) which actuates the second group 163 of freewheel bodies is inserted into the shaft 154. This shifting pin is arranged in the shaft 154 in such a way that two freewheel bodies 142 of the second group 163 are pivoted out, with the result that the engagement section 148 can be placed in engagement with the engagement section 140 of the internal toothing 136 of the idler gear 132.

Through selected rotational positions of the two shifting pins 156, two idler gears 132 can be connected in a rotationally fixed fashion to the shaft 154, with the result that one of the eighteen possible gear stages is shifted.

FIGS. 12A to 12F show radial sectional views through adjacent idler gears 132, during three phases of a gear change.

FIG. 12A shows a first of the idler gears 132 whose internal toothing 136 is in engagement with the two assigned freewheel bodies 142. The shifting pin 156 is in a rotational position in relation to the shaft 154, with the result that the actuation portions 164 of the shifting pin 156 are arranged in the region of the actuation portions 144 of the freewheel bodies 142, and the freewheel body 142 can therefore pivot outward.

The second of the idler gears 132, which is assigned to a next highest gear stage, specifically of the second gearspeed, is shown in FIG. 12B. The freewheel bodies 142 are pivoted in radially in the inward direction, and are consequently not in engagement with the internal toothing 136 of the idler gear 132. In the rotational position of the shifting pin 156, the actuation portions 164, which are assigned to the second gearspeed, are not arranged under the actuation portions 144 of the freewheel bodies 142, with the result that the actuation portions 144 are pressed outward.

If the shifting pin 156 is rotated, as indicated by an arrow 168, the actuation portion 164 remains underneath the freewheel body 142, which is assigned to the first of the idler gears 132 and therefore to the first gearspeed, as is illustrated in FIG. 12C, and the freewheel bodies 142 of the first gearspeed therefore remain pivoted out toward the outside.

FIG. 12D illustrates the second of the idler gears 132 in this rotational position of the shifting pin 156 which is assigned to the second gearspeed. In this rotational position of the shifting pin 156, the actuation portion 164, which is assigned to the second gearspeed, is arranged radially underneath the actuation portion 144 of the second gearspeed, with the result that the actuation portion 144 can pivot in the radially inward direction and the engagement section 148 can therefore pivot out in the radially outward direction. As a result, the engagement section 148 can be placed in engagement with the internal toothing 136 of the idler gear 132. The freewheel bodies 142 are each assigned a spring which prestresses the corresponding freewheel body 142 in such a way that the actuation portion 144 is pressed against the shifting pin 156. As a result, the engagement section 148 pivots out if one of the actuation portion 164 is rotated under the shifting pawl 142.

Since the higher gearspeed has a relatively low transmission ratio, the freewheel pawls 142 of the higher gearspeed engage in the internal toothing 136 and drive the shaft 154 with a rotational speed which is higher than the rotational speed of the idler gear 132 of the relatively low gearspeed. In this so-called intermediate state, the idler gear 132 of the relatively low gearspeed is therefore rotated in relation to the shaft 154 in the opposite direction. As a result, the sliding portion 138 of the idler gear 132 presses against the sliding portion 152 of the freewheel body 142, with the result that the freewheel body 142 is pivoted out in the inward direction and the first of the idler gears 132 slides on the shaft 154. The idler gear 132 of the relatively low gearspeed, that is to say of the first gearspeed, freewheels in the intermediate state.

FIGS. 12E and 12F illustrate the state in which the second gearspeed is completely engaged. For this purpose, the shifting pin 156 has been rotated onward in the direction of the arrow 168, with the result that the freewheel bodies 142 of the first gearspeed are pivoted in by the shifting pin 156, as is shown in FIG. 12E. FIG. 12F shows that the freewheel bodies 142 of the second gearspeed continue to be in engagement with the internal toothing 136 because the actuation portions 164 of the second gearspeed are arranged radially underneath the actuation portions 144 of the freewheel bodies 142.

Switching under load is possible by means of the intermediate state in which the freewheel bodies 142 of two subsequent gearspeeds are pivoted out radially. In addition an idling state is avoided.

When shifting into a low gearspeed occurs, the sliding section 138 of the internal toothing 136 of the relatively low gearspeed firstly slides over the freewheel bodies 142 in the intermediate state. The relatively high gearspeed initially remains engaged. The freewheel bodies 142 are then pivoted in or disengaged only when the load which is transmitted to the shaft 154 via the idler gear 132 is removed. In addition, the shifting pin 156 must then be rotated onward with the result that the actuation portion 144 is pressed outward. The relatively low gearspeed is then engaged immediately because this gearspeed was already in the intermediate state or in the freewheeling state. This avoids an idling state.

FIG. 12 illustrates a shifting pin 156 with actuation portions 164 lying precisely opposite one another. Alternatively it is also conceivable for the actuation portions 164 to be arranged in relation to one another in such a way that only one of the shifting pawls is placed in engagement with the internal toothing 136. This is implemented by virtue of the fact that the shifting pawls 142 on the shaft 154 are not arranged precisely opposite one another. As a result, the rotational angle of the idler gear 132 can be reduced in size until the actuation portion 148 latches into the internal toothing 136.

FIG. 13 shows the shaft 154 and the shifting device 104 in a perspective exploded illustration. The illustration in FIG. 13 corresponds to the circuit diagram in FIG. 5. Identical elements are denoted by identical reference numbers, with only the difference being explained here.

The tension disk 94' is connected to the ring gear 90' via the ring gear shaft 93'. The ring gear shaft 93' is formed as a hollow shaft in order to accommodate the output shaft 96'. The ring gear 90' is rotated by the tension disk 94' in order to rotate the shifting pin 156 in relation to the shaft 154.

The ring gear 90" has, in addition to the internal toothing 136, an external toothing 170. The external toothing 170 serves to connect the ring gear 90" to the tension disk 94" (not illustrated here) via the ring gear shaft 93" (not illustrated).

FIG. 14 shows a perspective illustration of the shaft 154 and of the shifting device 104 from FIG. 13 in the assembled state. Identical elements are provided with identical reference numbers, with only the differences being presented here.

The external toothing 170 of the ring gear 90" is connected in a rotationally fixed fashion to the ring gear shaft 93" which is connected to the tension disk 94". The ring gear shaft 93" is arranged offset in parallel with the ring gear shaft 93'. The ring gear shaft 93" is connected in a rotationally fixed fashion to a gearwheel 95 which meshes with the external toothing 170. The driven gears 102', 102" are each connected via a deflection gearwheel 172', 172" to the driven gears 102', 102". The deflection gearwheels 172', 172" serve to reverse the rotational direction of the shifting pin 157.

In order to permit a plurality of shiftable partial transmissions, for example partial transmissions 42 and 44, to be controlled with just one shifting cable or the like, it is possible to control a plurality of partial transmissions in a combined fashion. For this purpose, for example the shifting pin 74' can be formed in such a way that after the shifting pin 74' rotates onward beyond the last or highest gearspeed of this partial transmission, the first gearspeed follows again. In addition, in order to solve this problem it would be necessary to make available a mechanism which, when the shifting pin 74' rotates onward beyond the highest gearspeed, rotates the shifting pin 74" by one shift position into the next highest gearspeed. This can be implemented by virtue of the fact that the ring gear shafts 93', 93" of the planetary gear mechanisms 84', 84" are shifted together. For example, the two ring gears 90', 90" can therefore be connected together. For example, the transmission unit 10 can be shifted from the sixth gearspeed into the seventh gearspeed by virtue of the fact that the shifting pin 74', which is assigned to the partial transmission 42, is rotated onward after one rotation through 360°, in order to shift the partial transmission 44 from the sixth gearspeed into the first gearspeed again. The planetary gear mechanism 84", which is assigned to the partial transmission 44, is configured in such a way that when further rotation occurs after the sixth gearspeed in partial transmission 42, the second gearspeed is engaged after the first gearspeed in partial transmission 44. As a result of the fact that the first gearspeed follows the sixth gearspeed in the partial transmission 42 and at the same time the second gearspeed follows the first gearspeed in the partial transmission 44, the transmission unit can therefore be shifted from the sixth gearspeed into the seventh gearspeed.

The tension disk 94 is preferably connected to a shift lever via a cable pull. The tension disk is preferably prestressed with a spring with respect to the ring gear 90. The tension disk 94 and the ring gear 90 preferably have stops in order to prestress the tension disk 94 and the ring gear 90 one against the other with a defined spring force. The spring is relaxed as a result of the rotation of the ring gear 90, as a result of which the shifting pin 74 rotates and a gear change is carried out. If a gear change is carried out into a low gearspeed, the shift lever is firstly actuated, as a result of which the tension disk 94 is prestressed with respect to the ring gear 90 without the load of the transmission being reduced. Since under load the engagement sections 148 engage in the internal toothing 136 and latch in this position as a result of the transmitting torque, the shifting pin 156 cannot be rotated. As soon as the loading of the transmission drops, that is to say the rotational force is reduced, the shifting pin 74 can disengage the shifting pawl 142 and the internal toothing 136 owing to the spring prestress of the ring gear 90. In this context, the oscillating pedaling force profile which is typical during cycling can be used since the pedaling force which is applied to the foot pedals 16, 16' is greatly reduced in the vertical position of the foot pedals 16, 16'.

In such a position of the foot pedals 16, 16', a prestressed or preselected low gearspeed can be completely engaged.

In general it is advantageous to configure the employed gearwheels in accordance with the torque to be transmitted or in accordance with their transmission ratio. In this context, gearwheels which have to transmit large tangential forces or large torques should be correspondingly wider, that is to say should be made thicker in the axial direction. In contrast, it is appropriate to embody gearwheels which have a small transmission ratio with a relatively short width since said gearwheels have to transmit relatively small tangential forces or relatively small torques. As a result, the installation space in the transmission housing can be optimized. In addition it is preferred for the shifting means which are formed by the freewheel pawls and the shifting pin to be configured in accordance with the tangential forces and the expected torques. In this context it is also conceivable to adapt the number of freewheel pawls 142 to the torques to be transmitted.

If the transmission unit 10 is additionally formed with the planetary gear mechanism 114, as is illustrated in FIG. 6, the actuation of the partial transmission 112 has to be combined with the actuation of the planetary gear mechanism 114. The shifting pin 74 then controls the clutch 120 of the planetary gear mechanism 114. The ring gear 90 of the planetary gear mechanism 84 from FIG. 4 or FIG. 5 then additionally controls a shifting fork which actuates the clutch 124 of the planetary gear mechanism 114. The method of functioning of this shifting control is explained in more detail below.

FIG. 15 shows an exploded illustration of a shifting pin for actuating a clutch of the planetary gear mechanism 114. This embodiment of the shifting pin is denoted generally by 174. The shifting pin 174 has the actuation portions 164. The shifting pin 174 can be connected in a rotationally fixed fashion at an axial end to the driven gear 102. At an axial end of the shifting pin which lies opposite, a groove 176 is formed in the shifting pin 174. The groove 176 has two portions running in the circumferential direction, which portions are offset axially with respect to one another. The two circumferentially running portions are connected by an oblique section 178.

FIG. 15 illustrates a spring 180 and an input element 182 of the clutch 120. The input element 182 is assigned a pin 184 which can be introduced into a drill hole 186 in the input element 182.

In the inserted state, the spring 180 is plugged onto the shifting pin 174, and the pin 184 is introduced into the drill hole 186, with the result that the pin 184 engages in the groove 176. The input element 182 is axially pre-loaded with respect to the shifting pin 174 by the spring 180. If the shifting pin 174 is rotated in relation to the input element 182 with the result that the pin 184 slides along the oblique section 178 of the groove 176, the input element 182 is moved in the axial direction by a spring force of the spring 180 and is placed in engagement with an output element (not illustrated) of the clutch 120. The clutch 120 of the planetary gear mechanism 114 can therefore be actuated by rotation of the shifting pin 174.

Figure 16:
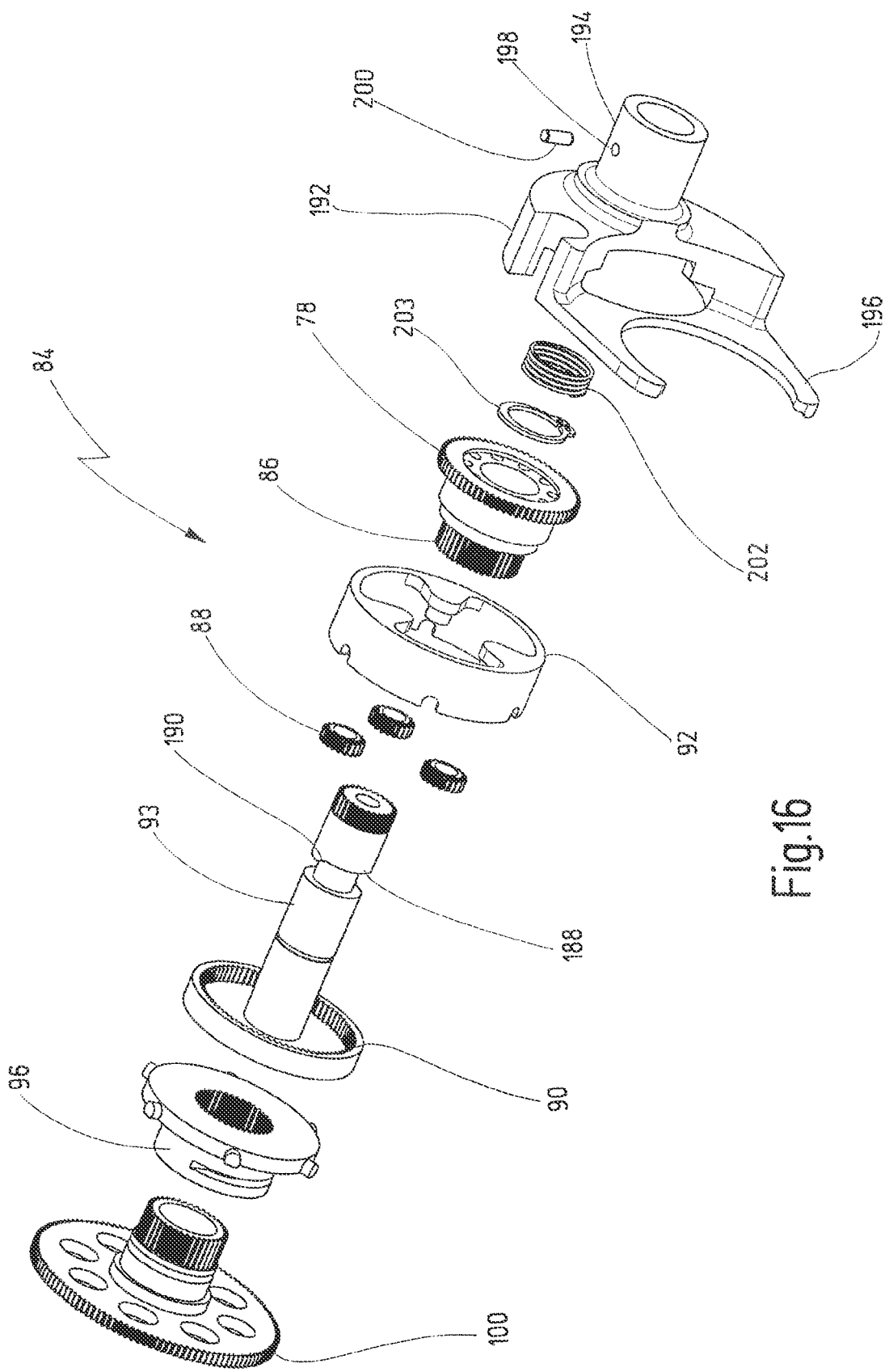
FIG. 16 shows an exploded illustration of the planetary gear mechanism with a shifting fork.

FIG. 16 is an exploded illustration of the planetary gear mechanism 84 with a shifting fork for actuating the clutch 124. Identical elements are denoted by identical reference numbers, with only the differences being illustrated here.

The ring gear shaft 93 has a groove 188 which has two portions running in the circumferential direction. The portions which run in the circumferential direction are offset axially with respect to one another and connect by an oblique section 190. In addition, the shifting device from FIG. 16 has a shifting fork 192 which has a sleeve section 194 and a fork section 196. The sleeve section 194 has a drill hole 198 through which a pin 200 can be inserted. In addition, the shifting device has a spring 202 which is arranged between the driven gear 78 and the shifting fork 192. In the assembled state, the sleeve section 194 is mounted in the region of the groove 188, with the result that the pin 200 which is guided through the drill hole 198 engages in the groove 188. The pin 202 is supported on a retaining ring 203 and pre-loads the shifting fork 192 axially. As a result, the pin 200 bears, in the groove 188, against an edge on which the oblique section 190 is formed.

If a gearspeed is shifted by means of this shifting device, the ring gear shaft 93 is rotated through a specific rotational angle, as described above. If the rotation of the ring gear shaft 93 is formed in such a way that the pin 200 slides over the oblique section, the shifting fork is displaced axially depending on the rotational direction of the ring gear shaft 93. As a result of this axial displacement, the clutch 124 is actuated, as is explained in more detail below.

Figure 17:
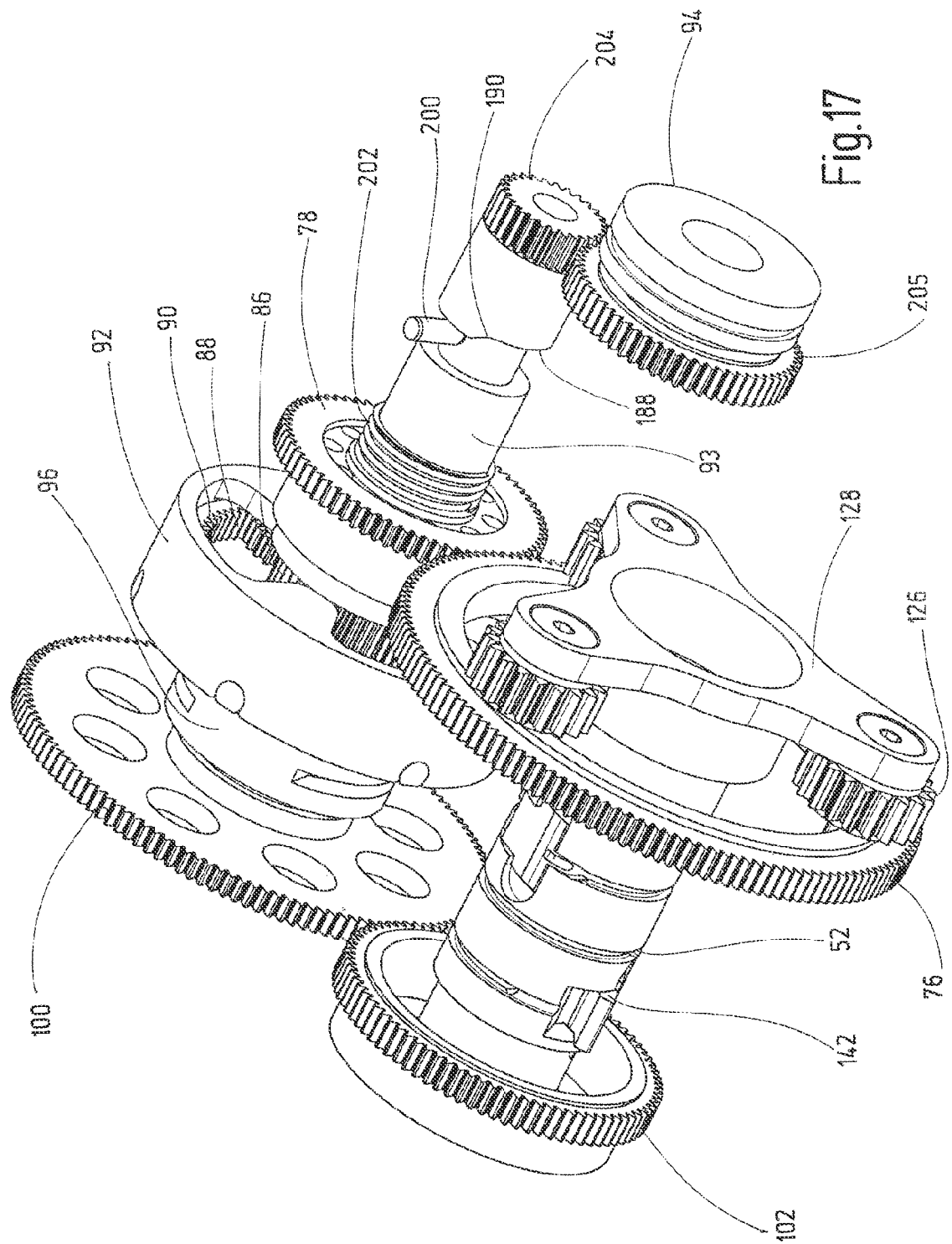
FIG. 17 shows a perspective illustration of the shifting means with a rotatable shifting pin and a shiftable planetary gear mechanism.

FIG. 17 illustrates the shifting device according to FIG. 16 in the assembled state with the shaft 52 and parts of the planetary gear mechanism 114. Identical elements are denoted by identical reference numbers, with only the differences being explained here.

The ring gear shaft 93 has a gearwheel section 204. The gearwheel section 204 is connected in a rotationally fixed fashion to a driving gearwheel 205 of the tension disk 94. A defined rotation can be transmitted to the ring gear shaft 93 through the tension disk 94 and a gearwheel pair formed by the gearwheel section 204 and the driving gearwheel 205. If the pin 200 slides over the oblique section 190 during this rotation, the shifting fork 192 (not illustrated in FIG. 17) is moved in the axial direction. As a result, the clutch 124 can be actuated.

Figure 18:
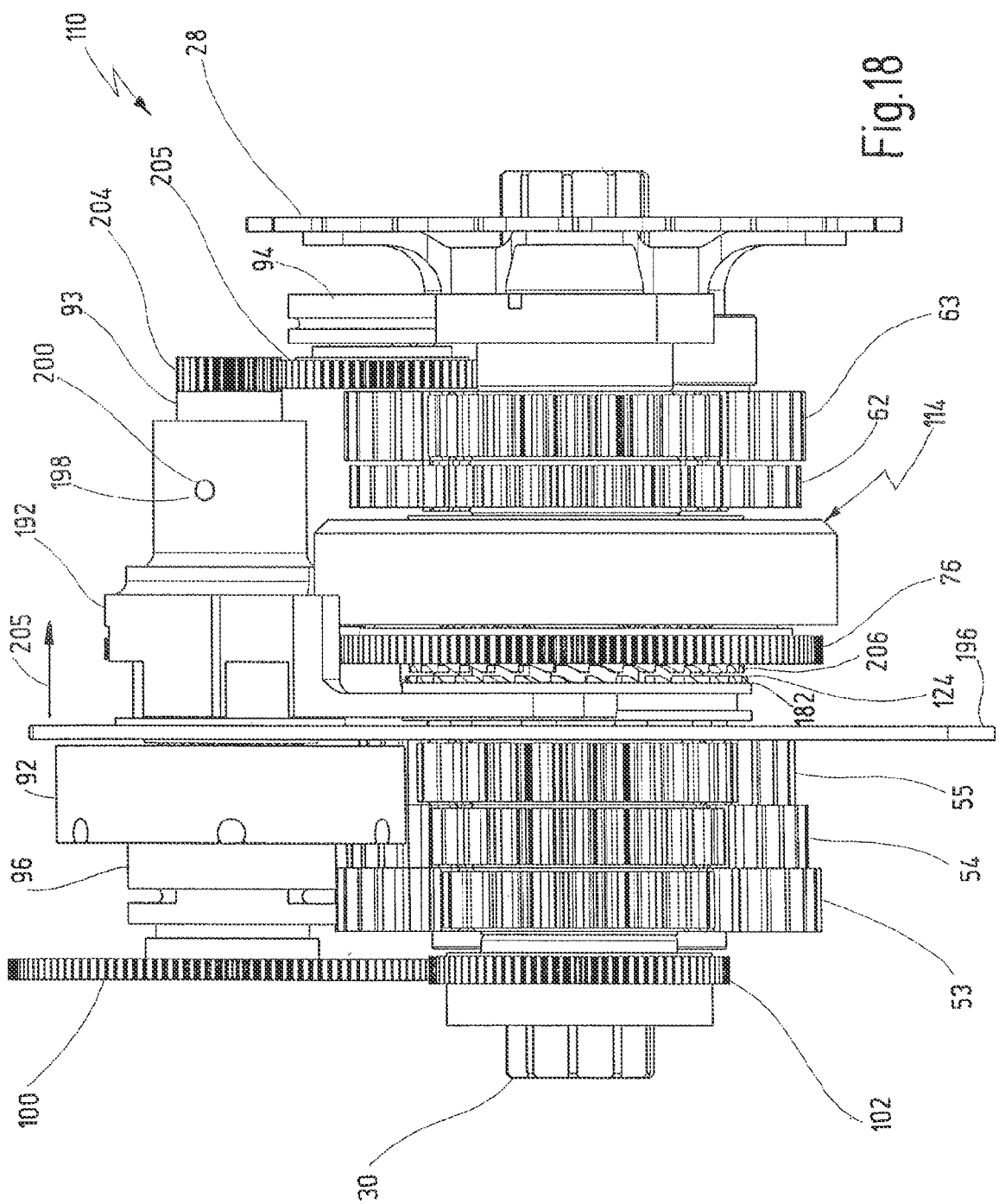
FIG. 18 shows a schematic side view of the shifting device with a rotatable shifting pin and a shiftable planetary gear mechanism.

FIG. 18 is a schematic illustration of a side view of the transmission unit 110 with a shifting device. Identical elements are denoted by identical reference numbers, with only the differences being presented here.

As described above, the shifting fork 192 can be displaced axially by rotating the ring gear shaft 93. The fork section 196 is connected to the input element 182 of the clutch 124. If the fork section 196 is displaced in the axial direction, specifically in the direction of an arrow 205, the input element 182 is placed in engagement with an output element 206 of the clutch 124. The clutch 124 can therefore be actuated by actuating the tension disk 94. As a result of the fact that the rotation of the shifting pin 174 is connected directly to the rotation of the ring gear shaft 93, it is possible for the clutch 124 to be actuated when the assigned partial transmission is shifted onward from the highest gearspeed into the first gearspeed.

Figure 19:
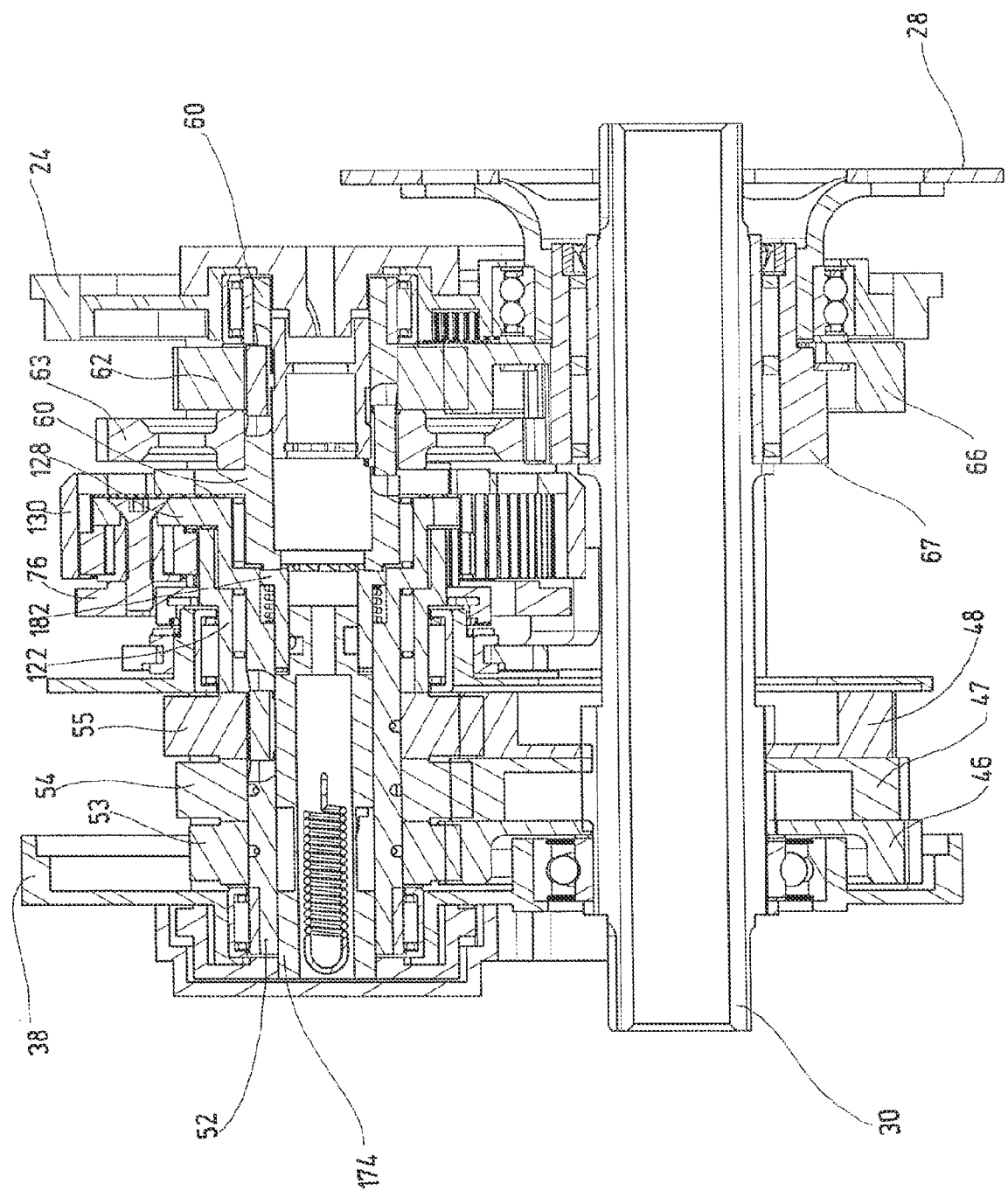
FIG. 19 shows a schematic sectional illustration of a transmission unit with a rotatable shifting pin and a planetary gear mechanism.

In FIG. 19, a schematic sectional view of the transmission unit 110 is illustrated as a section through the input shaft 30 and the countershaft 52.

Figure 20A:
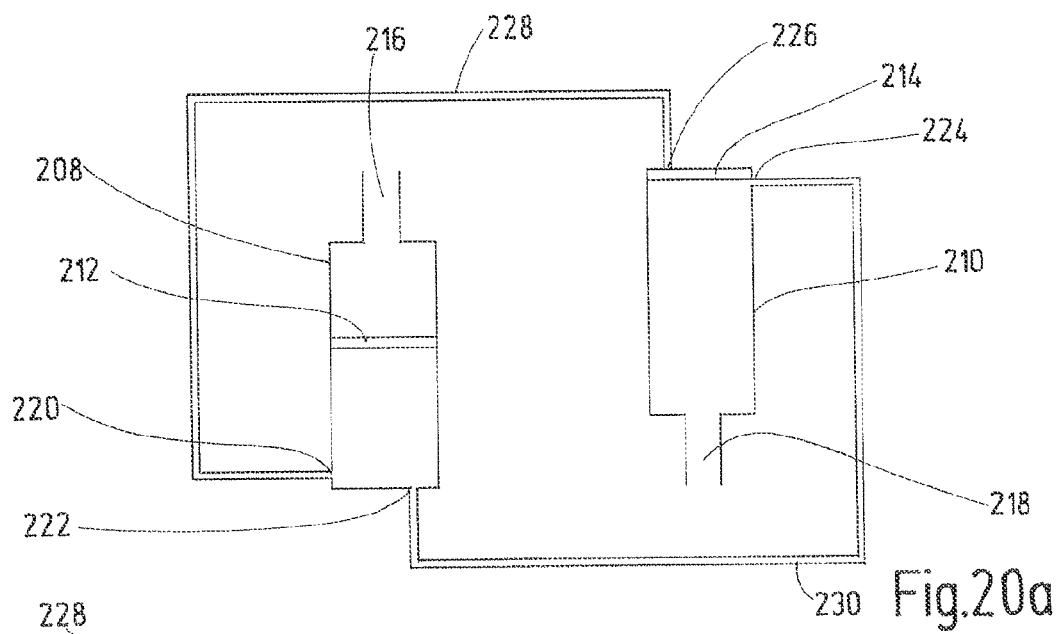
FIGS. 20A-C show basic outlines explaining the method of functioning of two hydraulic cylinders which are connected in series.
Figure 20B:
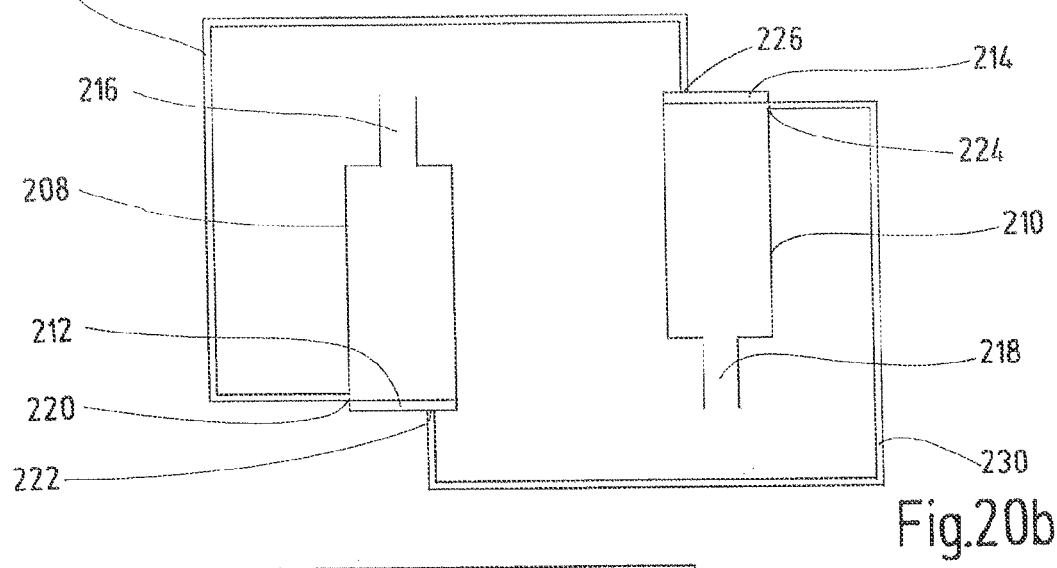
Figure 20C:
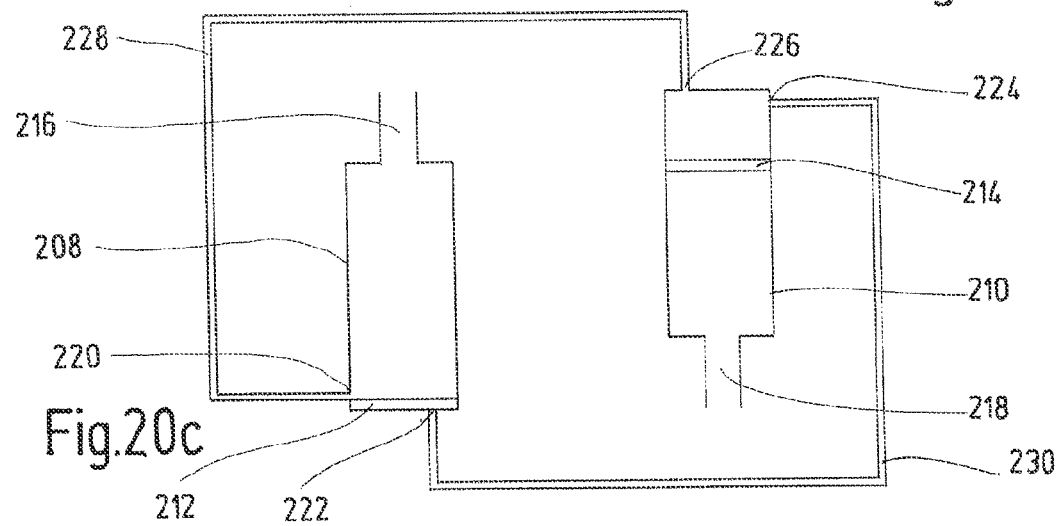

FIGS. 20a-c are schematic illustrations of a hydraulic system of hydraulic cylinders which are connected in series. The hydraulic system has a first hydraulic cylinder 208 and a second hydraulic cylinder 210. A hydraulic piston 212, 214 is arranged in an axially moveable fashion in each of the hydraulic cylinders 208, 210. The hydraulic cylinders 208, 210 each have a main opening 216, 218 and each have two secondary openings 220, 222, 224, 226. The secondary opening 220 is connected to the secondary opening 226 via a duct 228. The secondary opening 222 of the first hydraulic cylinder 208 is connected to the secondary opening 224 in the hydraulic cylinder 210 via a duct 230. The secondary openings 220, 222, 224, 226 are each arranged opposite the main openings 216, 218.

If hydraulic pressure is applied to the first hydraulic cylinder 208 through the main opening 216, the hydraulic piston 212 moves in the direction of the secondary openings 220, 222. As a result, hydraulic fluid is conducted through the secondary opening 222 and the duct 230 through the secondary opening 224 into the hydraulic cylinder 210. Since the secondary opening 224 is arranged underneath the hydraulic piston 214, the hydraulic fluid is forced into the hydraulic cylinder 210 without a force being applied to the hydraulic piston 214. The hydraulic fluid leaves the hydraulic cylinder 210 through the main opening 218.

In FIG. 20b, the hydraulic piston 212 has arrived at one end of the hydraulic cylinder 208. In this position, the secondary opening 222 is closed off and the secondary opening 220 is opened, with the result that hydraulic fluid can be forced from the hydraulic cylinder 208 and through the duct 228. The hydraulic pressure acts, in this position, on the hydraulic piston 214 through the secondary opening 226. This application of pressure moves the hydraulic piston 214 in the direction of the main opening 218. This is illustrated in FIG. 20c.

If hydraulic pressure is then applied to the second hydraulic cylinder 210 through the main opening 218, the hydraulic piston 214 firstly moves in the direction of the secondary opening 226. The hydraulic fluid is conducted through the duct 228 and into the hydraulic cylinder 208, and is directed out of the hydraulic cylinder 208 though the main opening 216. If the hydraulic piston 214 has arrived at the end of the hydraulic cylinder 210, hydraulic pressure is applied to the hydraulic piston 212 through the duct 230 and the hydraulic piston 212 is moved in the direction of the main opening 216.

Two hydraulic pistons can be moved one after the other through this series connection of two hydraulic cylinders.

Figure 21:
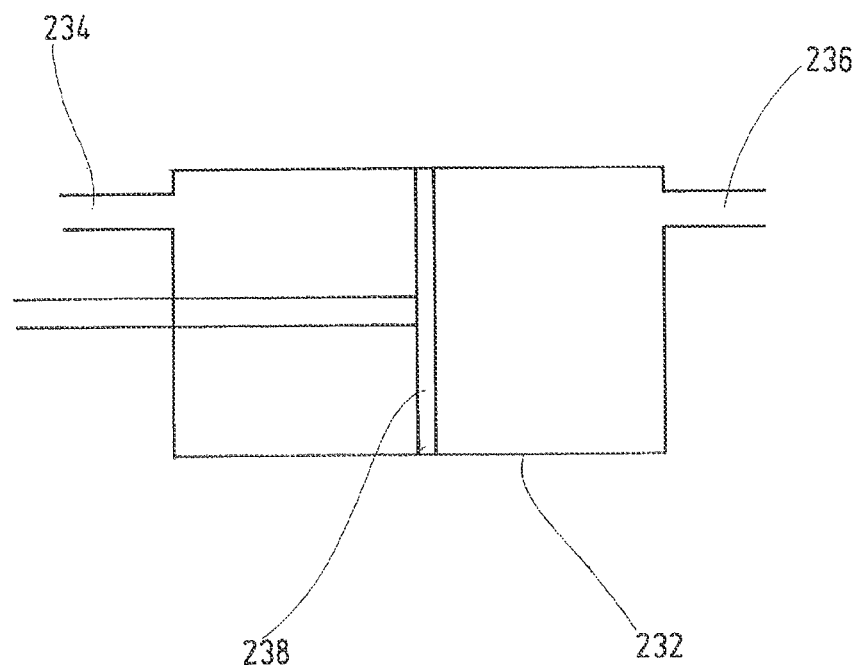
FIG. 21 shows a basic outline explaining a double-acting hydraulic cylinder.

FIG. 21 illustrates the principle of a double-acting cylinder. FIG. 21 shows a hydraulic cylinder 232 which has an opening 234 and an opening 236. The openings 234, 236 are arranged on opposite sides of the hydraulic cylinder 232. An axially moveable hydraulic piston 238 is located between the openings 234, 236. If hydraulic pressure is applied to the hydraulic cylinder 232 through the opening 234, the hydraulic piston 238 moves in the direction of the opening 236. Hydraulic oil is discharged from the hydraulic cylinder 232 through the opening 236. In order to move the hydraulic piston 238 in an opposite direction, specifically in the direction of the opening 234, hydraulic pressure is applied to the hydraulic cylinder 232 through the opening 236. As a result, the hydraulic piston 238 moves in the direction of the opening 234, through which hydraulic oil is discharged from the hydraulic cylinder 232.

Figure 22:
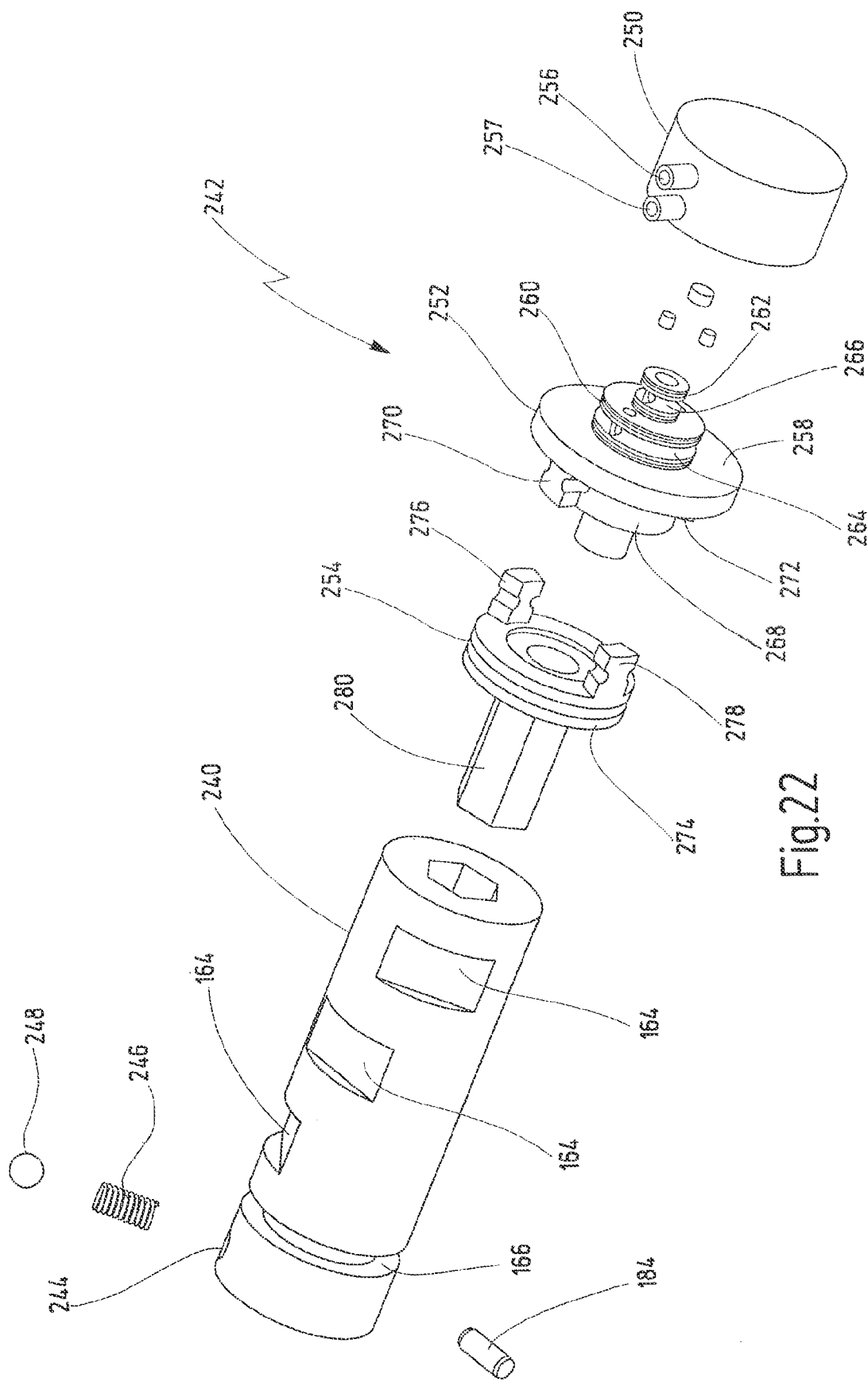
FIG. 22 shows an exploded illustration of a hydraulic unit for activating the rotatable shifting pin.

FIG. 22 is an exploded illustration of a shifting pin with a hydraulic drive system. The shifting pin is generally denoted by 240. The hydraulic system is generally denoted by 242.

The shifting pin 240 has the groove 166 into which the pin 184 can engage. A radial drill hole 244, which is provided for accommodating a spring 246 and a ball 248, is formed in the shifting pin 240. The drill hole 244 forms a latching device together with the spring 246 and the ball 248.

The actuation sections 164 are formed in the shifting pin 240. The hydraulic drive system 242 has a hydraulic master 250, a hydraulic slave 252 and an actuator 254 or a vane positioner 254. The hydraulic master 250 has two hydraulic connections 256, 257. The hydraulic connections are provided for being connected to hydraulic hoses and for supplying the hydraulic drive system 242 with hydraulic pressure. The hydraulic slave has a separating disk 258. Two rotationally symmetrical connecting elements 260, 262 are formed on a side of the separating disk 258 facing the hydraulic master 250. The connecting elements 260, 262 each have a groove 264, 266 which is formed in the circumferential direction. On the side of the separating disk 258 lying opposite the connecting elements 260, 262, a cylindrical section 268 is formed with two slave vanes 270, 272 which protrude radially. The actuator has a cylindrical section 274 on which two actuator vanes 276, 278, which protrude in the axial direction, are formed. In addition, the actuator 254 has a connecting section 280. The connecting section 280 has a hexagonal profile.

Figure 23:
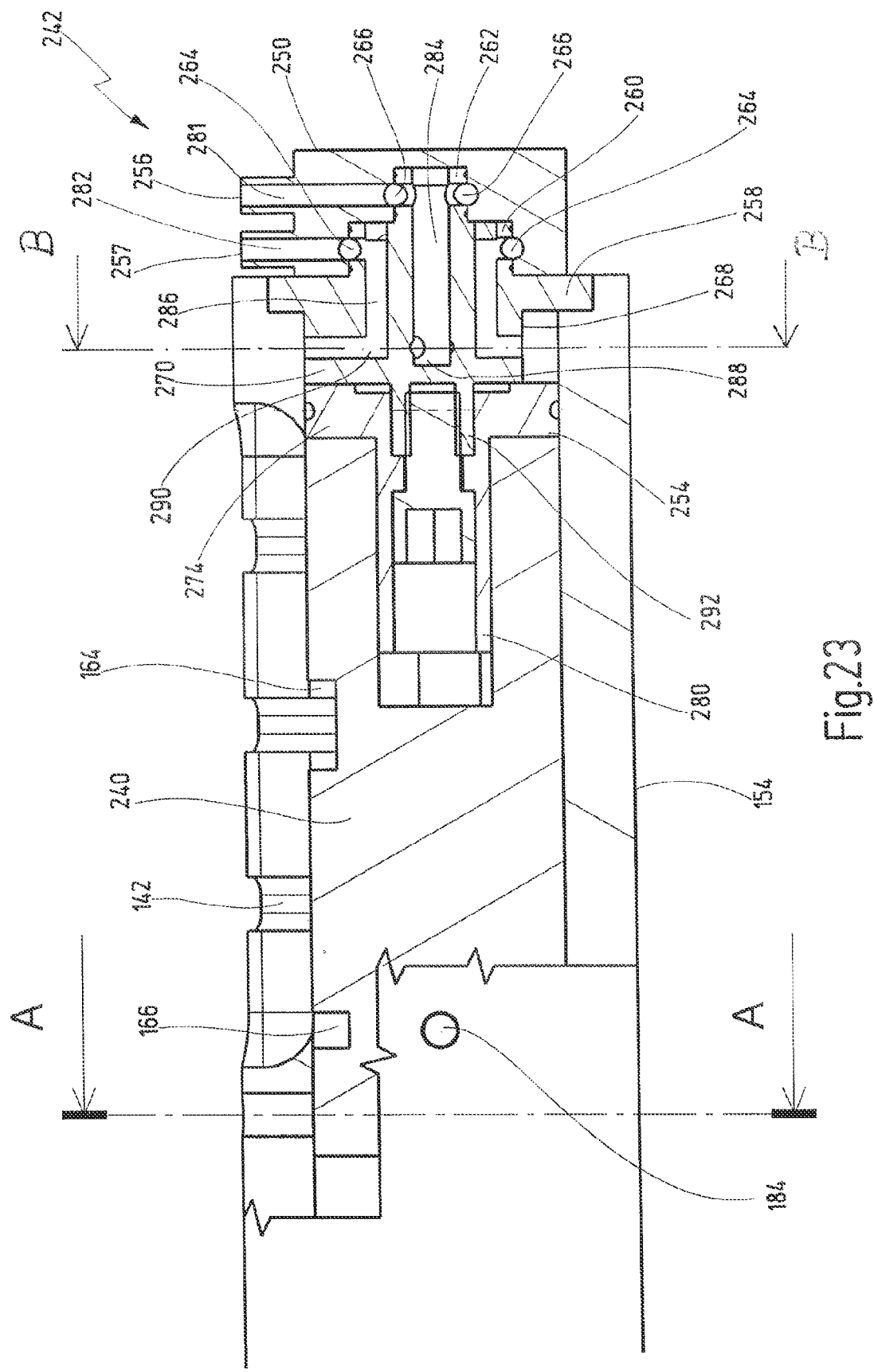
FIG. 23 shows a schematic sectional view of a shaft with a shifting pin and a hydraulic unit according to FIG. 22.

FIG. 23 illustrates the shifting pin 240, the shaft 154 and the hydraulic drive system 242 in an axial sectional view. In this illustration, the shifting pin 240 is mounted in the shaft 154.

The hydraulic connections 256, 257 are connected to one hydraulic duct 281, 282 each. The hydraulic ducts 281, 282 are connected to the grooves 264, 266. The grooves 264, 266 are connected to axial ducts 284, 286 which are formed in the axial direction in the hydraulic slave. The axial ducts 284, 286 are connected to radial ducts 288, 290 which are formed in the cylindrical section 268. The radial ducts 288, 290 are positioned in the circumferential direction in the cylindrical section 268 in such a way that they are partially formed in the slave vanes 270, 272. A bearing pin 292 of the hydraulic slave is rotatably mounted in the actuator 254. The separating disk 258 is connected in a rotationally fixed fashion to the shaft 154.

The connecting section 280 is mounted in a rotationally fixed fashion in a receptacle section of the shifting pin 240.

The hydraulic master 250 is secured to the transmission housing (not illustrated) and/or connected thereto. The hydraulic slave 252 is mounted so as to be rotatable in relation to the hydraulic master 250. The actuator 254 is mounted so as to be rotatable in relation to the hydraulic slave 252. By virtue of the fact that the hydraulic ducts 281, 282 are connected to the circumferential grooves 262, 264, hydraulic pressure can always be applied to the hydraulic slave 252 irrespective of the rotational position in relation to the hydraulic master 250. The hydraulic pressure is fed to openings in the region of the slave vanes through the axial ducts 284, 286 and the radial ducts 288, 290.

Figure 24:
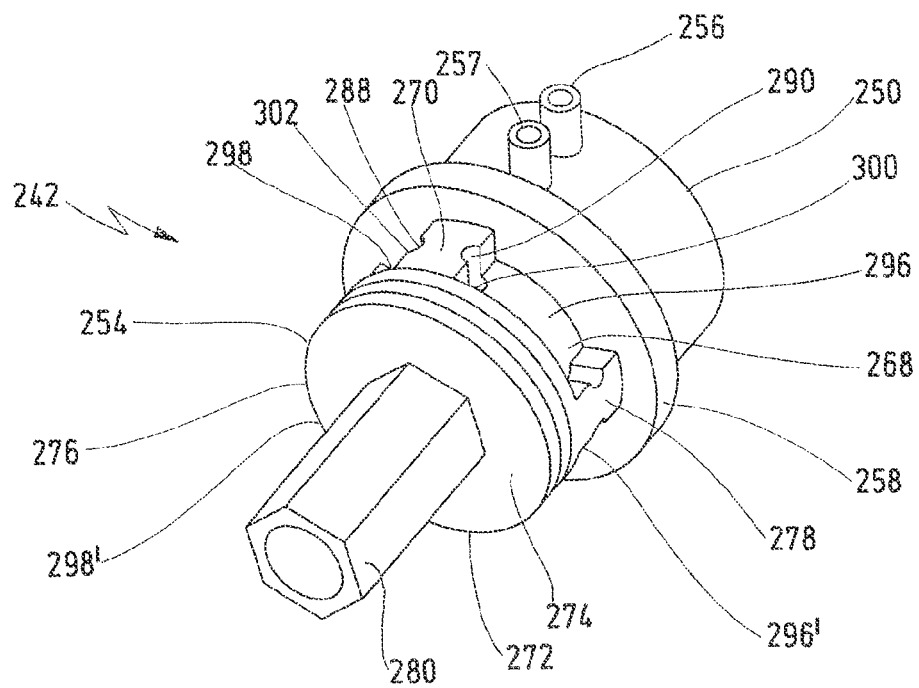
FIG. 24 shows a perspective illustration of the hydraulic unit for activating the rotatable shifting pin.

FIG. 24 is a perspective illustration in an assembly drawing of the hydraulic drive system 242. Identical elements are denoted by identical reference numbers, with only the special features being explained here.

In the assembled state of the hydraulic drive system 242 which is illustrated in FIG. 24, a hydraulic chamber 296 is formed between the cylindrical section 274, the separating disk 258, the slave vane 270 and the actuator vane 278. On the opposite side of the slave vane 270, a further hydraulic chamber 298 is formed. Likewise, two further hydraulic chambers 296', 298' are formed on opposite sides of the actuator vanes 278, 276. The radial ducts 288, 290 are formed as cylindrical grooves on two sides of the slave vanes 270, 272. Formed adjacent to the slave vanes 270, 272 are openings 300, 302, into which openings 300, 302 the radial ducts 288, 290 lead.

If a hydraulic pressure is built up by the hydraulic connection 257, the hydraulic fluid passes through the opening 300 into the hydraulic chamber 296. The hydraulic pressure applies a force to the actuator vane 278 and moves it in the circumferential direction. As a result, the actuator 254 is rotated and therefore the shifting pin which is connected to the actuator 254 also rotates. Since the separating disk 258 is connected in a rotationally fixed fashion to the shaft 154, the shifting pin 240 is therefore rotated in relation to the shaft 154.

If a hydraulic pressure is fed through the hydraulic connection 256, hydraulic fluid passes through the axial duct 284 and the radial duct 288 to the opening 302 and into the hydraulic chamber 298. The hydraulic pressure in the hydraulic chamber 298 moves the actuator vane 276 and therefore rotates the shifting pin 240 in an opposite direction.

The functional principle of the hydraulic drive system 242 will be explained in more detail below.

Figure 25:
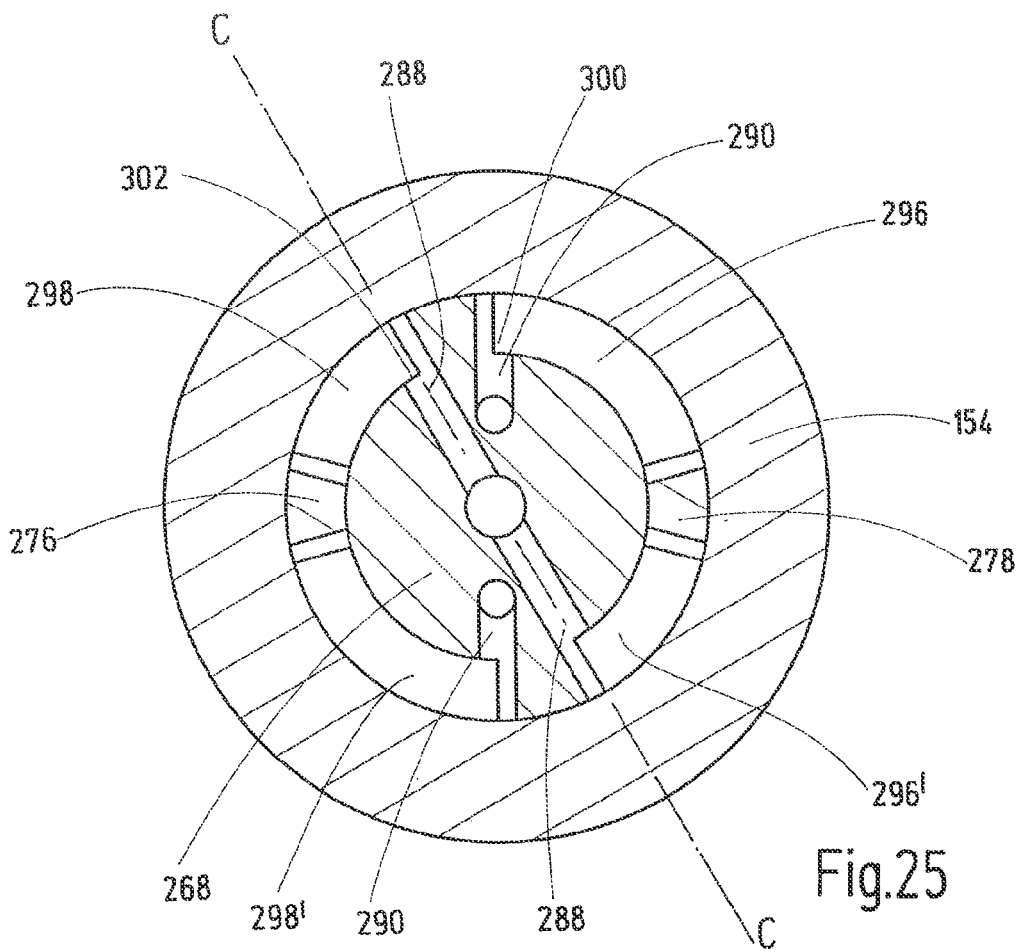
FIG. 25 shows a sectional view of the shifting pin from FIG. 23, showing the section along the line B-B.

FIG. 25 illustrates a section along the line B-B from FIG. 23. Identical elements are denoted by identical reference numbers, with only the differences or special features being described here.

The hydraulic chambers 296, 296' 298, 298' are formed between the shaft 154 and the cylindrical section 168. The hydraulic chambers 296, 298' are connected to the hydraulic connection 257 via the radial ducts 290 and the axial duct 286. If hydraulic pressure is applied to the hydraulic connection 257, a hydraulic pressure is built up in the hydraulic chambers 296, 298' and the actuator vanes 276, 278 are rotated in the clockwise direction. The actuator vanes 276, 278 are correspondingly rotated in the counter-clockwise direction if a hydraulic pressure is applied to the hydraulic connection 256.

The hydraulic chambers 298, 298', 296, 296' which are illustrated in FIG. 25 consequently operate according to the principle of a double-acting cylinder.

It is also conceivable for the actuator vanes 276, 278 to be moveable independently of one another. The hydraulic chambers 298, 298' are connected in series with the hydraulic chambers 296, 296' in this alternative embodiment, with the result that a hydraulic system is implemented such as is explained schematically in FIGS. 20a to 20c. As a result, the shifting pin 240 could be rotated through a rotational angle which is twice as large. The ducts 228, 230 are arranged here in the hydraulic slave 252 in such a way that the ducts 228, 230 are opened precisely when one of the actuator vanes 276, 278 has reached a stop. This ensures that the hydraulic chambers 296, 296', 298, 298' are filled and respectively emptied sequentially.

Figure 26:
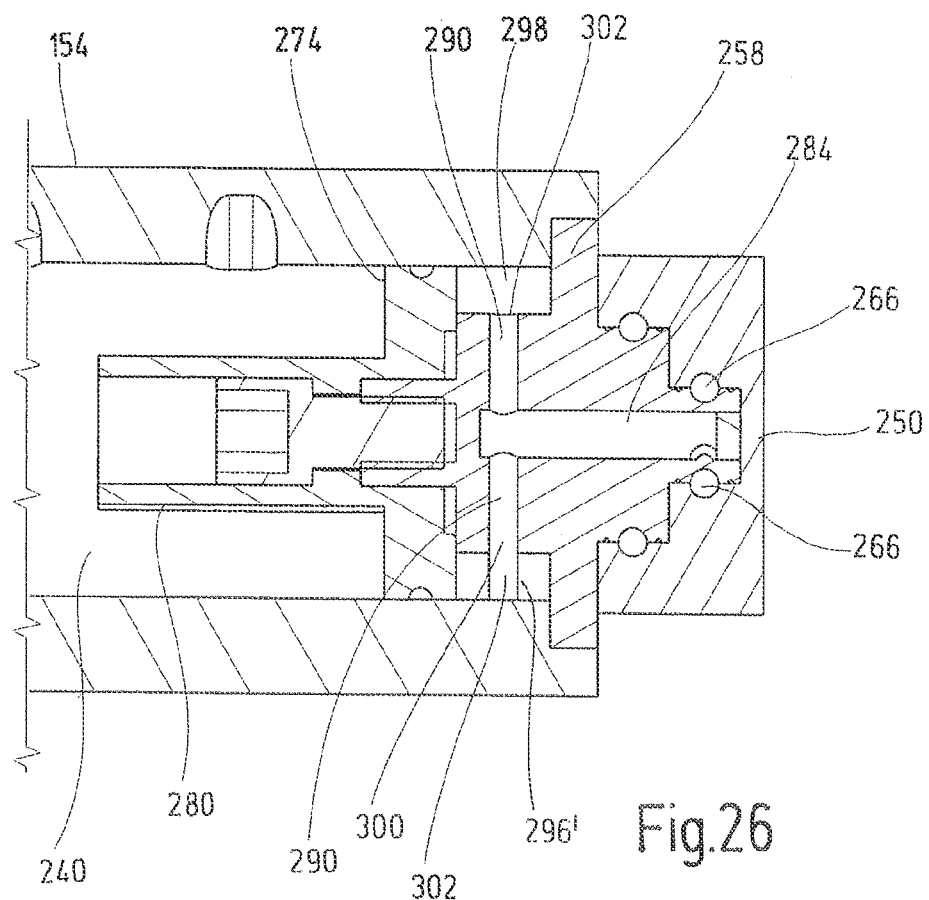
FIG. 26 shows a sectional view of a shifting pin with a hydraulic unit showing the section along the line C-C from FIG. 25.

FIG. 26 illustrates a section through the hydraulic drive system 242 along the line C-C.

Figure 27:
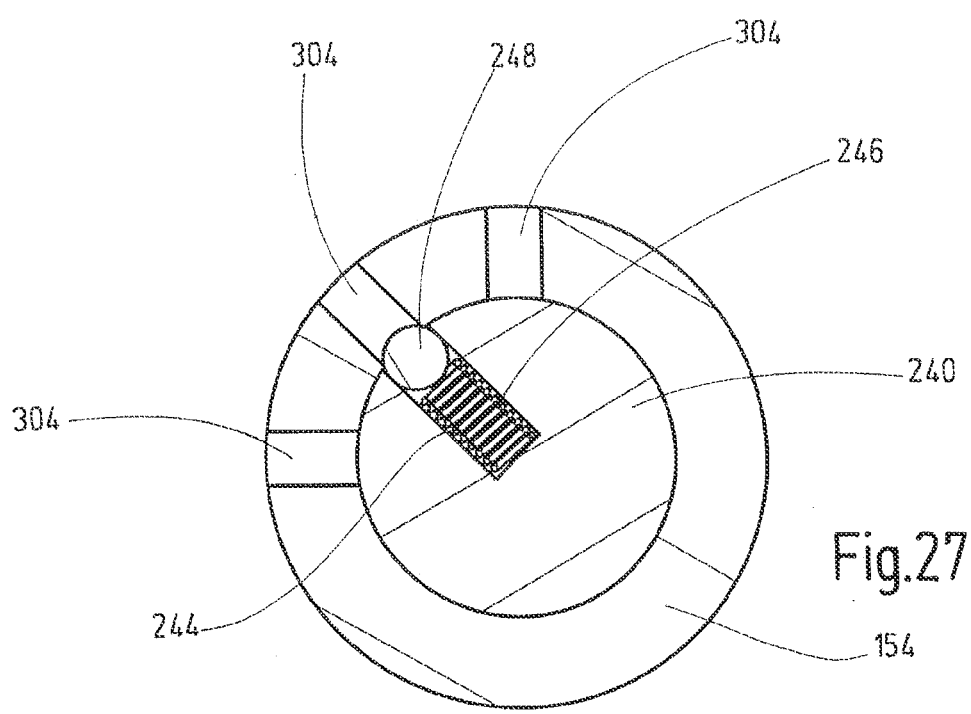
FIG. 27 shows a sectional view of a latching device of the shifting pin showing a section along the line A-A from FIG. 23.

FIG. 27 illustrates a section along the line A-A from FIG. 23. FIG. 27 shows the latching device which is formed by the ball 248, the spring 246 and drill holes 304. The drill holes are formed at different circumferential positions in the shaft 154. The spring 246 applies a force to the ball 248. The ball is pressed by this force into the drill hole 304 or partially into the drill hole 304, and thereby forms a latching connection. This latching connection causes the shifting pin 240 to latch in at predefined rotational positions in relation to the shaft 154. A predetermined torque must advantageously be applied to the shifting pin 240 in order to release the latching device and rotate the shifting pin 240 in relation to the shaft 154. The relative rotational position is thereby defined and fixed.

In one alternative embodiment, the spring 246 and the ball 248 are arranged in a radial drill hole which is formed in the shaft 154. In this context, drill holes, with which the ball 240 forms a latching connection, are formed at different circumferential positions in the shifting pin 240.

Alternatively, the freewheel bodies can also be activated magnetically. For this purpose, the actuation sections 164 can be provided with permanent magnets. Alternatively, the shifting pin 156 can be activated by means of electromagnetic actuators.

Figure 28:
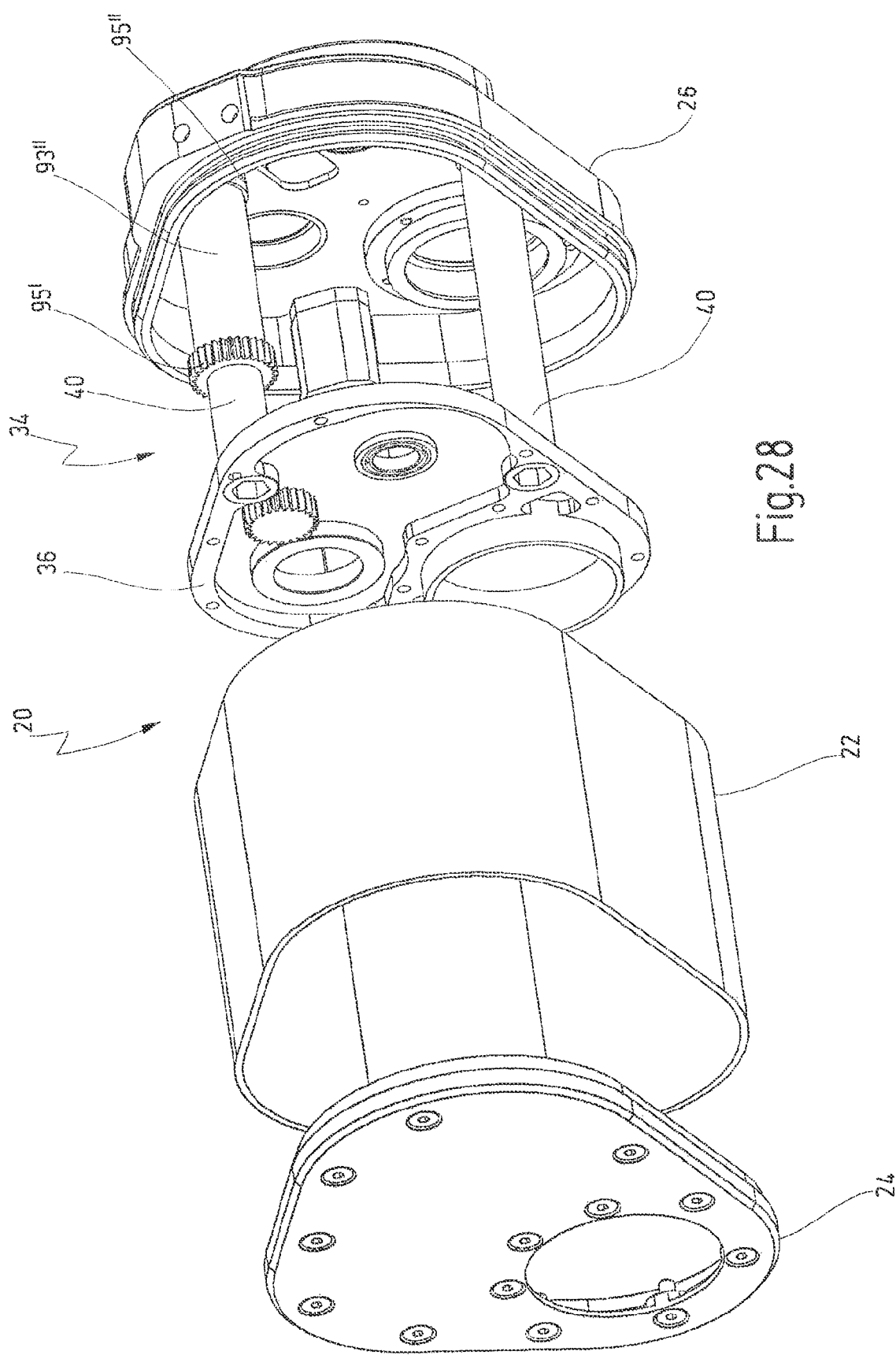
FIG. 28 shows an exploded illustration of a transmission housing for holding a transmission unit.

FIG. 28 illustrates the transmission housing 20 in an exploded illustration. The transmission cage 34 is provided for accommodating and mounting the transmission unit 10, 110. The transmission cage 34 is formed by the pins 40 which are connected to the bearing plate 36 and to the housing cover 26. The housing cover 26 advantageously forms both a termination of the housing casing 22 and the bearing plate 36 for the transmission cage 34. The bearing plate 36 can preferably also be formed in one piece with the housing cover 24, with the result that a further saving in weight is achieved.

In an alternative embodiment, the transmission units 10, 110 can also be shifted with an axially displaceable shifting pin. The shifting pawls 142 are, in this alternative embodiment, of similar or identical design to the shifting device 70, 104 with rotatable shifting pin 156. The axially displaceable shifting pin has recesses with oblique sections, wherein the recesses are arranged under the actuation sections 144, with the result that the prestressed shifting pawls 142 pivot out. The engagement of the shifting pawls 142 in the internal toothing 136 takes place as in the rotatable shifting pin 156. The oblique sections of the recesses serve to allow the actuation sections 144 of the shifting pawls 142 to slide more easily out of the recess and therefore permit the engagement section 148 to be pivoted radially inward. As in the case of the rotatable shifting pin 156, the recesses are arranged on the shifting pin in such a way that two gearspeeds are engaged simultaneously, and the so-called intermediate state is therefore set when shifting from one gearspeed into the other gearspeed occurs. As a result, shifting under load is also possible in this embodiment. The axially displaceable shifting pin can be activated by a shifting cable. The stationary or non-rotating shifting cable is decoupled from the rotating shifting pin by means of a sliding bearing or roller bearing. Alternatively, the shifting cable can be connected to a rotating disk which is connected to the shifting pin via a groove guide. In this context, a pin engages in the obliquely running groove which is formed in the rotating disk. The shifting cable is connected to the rotating disk. The disk is rotated by the shifting cable and the rotational movement of the disk is converted into an axial movement of the shifting pin through the pin which is guided in the groove. Alternatively, the pin can be secured to the disk and the groove can be formed in the shifting pin.

FIG. 29 shows a circuit diagram of a shifting device with two rotatable shifting pins. The shifting device which is illustrated in FIG. 29 is an alternative embodiment to the shifting device 104 illustrated in FIG. 4 and is generally denoted by 310. Identical elements are denoted by identical reference numbers, with only the differences being explained here.

The driving gear 76 is connected in a rotationally fixed fashion to a driven gear 312. The driven gear 312 is connected to two planetary gear mechanisms 311', 311". The driving gear 76 forms, together with the driven gear 312, an epicyclic transmission 313. The driven gear 312 is connected in a rotationally fixed fashion onto the planetary carriers 92', 92" of the planetary gear mechanisms 311' and 311". Planetary gear sets are mounted on the planetary carriers 92', 92". The planetary gear sets are each formed by a first planetary gear 314 and a second planetary gear 316. The first planetary gear 314 is connected in each case in a rotationally fixed fashion to the second planetary gear 316. A first sun gear 318 is arranged coaxially with respect to the planetary carrier 92 and meshes with the first planetary gears 314. The first sun gear 318 is connected in a rotationally fixed fashion to the output shaft 96 which is connected in a rotationally fixed fashion into the driving gear 100 of the epicyclic transmission 98. A second sun gear 320, which meshes with the second planetary gears 316, is mounted coaxially with respect to the sun gear 318. The second sun gear 320 is connected in a rotationally fixed fashion to the ring gear shaft 93 which is connected to the tension disk 94. The first sun gear 318 and the first planetary gears 314 form a first transmission ratio which differs from a second transmission ratio of the second sun gear 320 with the second planetary gears 316.

The rotation of the shaft 72 is transmitted to the driven gear 312 via the driving gear 76. The driven gear 312 drives the planetary gear mechanisms 311', 311". In this context, the planetary carrier 92, on which the planetary gear sets are mounted, is driven. The planetary gear mechanisms 311', 311" are formed as stepped planetary gear mechanisms. The first sun gear 318 meshes with the first planetary gears 314 and forms the output of the planetary gear mechanisms 311', 311". If the tension disk 94 is not activated and the second sun gear 320 is therefore at rest, the rotation of the shaft 72 is transmitted to the shifting pins 74', 74" via the epicyclic transmission 313, the planetary gear mechanisms 311', 311" and the second epicyclic transmissions 98', 98". In this state, the transmission ratio is just one, with the result that the shifting pins 74', 74" rotate synchronously with the shaft 72 or with the same rotational speed as the shaft 72. The second sun gear 320 serves as a further driving gear of the planetary gear mechanisms 311', 311". A rotation of the sun gear 320 is consequently added to the rotation of the driven gear 312, with the result that a rotation of the tension disk 94 can be transmitted to the shifting pin 74.

The method of functioning of the shifting device 310 is consequently identical to the method of functioning of the shifting device 104 from FIG. 5.

FIG. 30 illustrates an exploded illustration of the shifting device 310. Identical elements are denoted by identical reference numbers, with only the differences or the special features being presented here.

The driven gear 312 and the planetary carriers 92', 92" are formed as a gearwheel with bearing holes and bearing pins. The driving gear 312 is mounted so as to be rotatable by means of a ball bearing on a bearing shaft 322. The planets are formed from the planetary gears 314 and 316 which have different diameters and/or numbers of teeth. The first sun gear 318' is formed as an external toothing on the output shaft 96' which is formed as a hollow shaft. The second sun gear 320' is formed as an external toothing on the ring gear shaft 93' which is formed as a hollow shaft. The output shaft can be connected to the driving gear 100' of the epicyclic transmission 98'. The ring gear shaft 93' is connected in a rotationally fixed fashion to the tension disk 94'. The bearing shaft 322, the output shaft 96' and the ring gear shaft 93' are formed in such a way that they can be arranged or mounted coaxially one in the other.

The first sun gear 318" is formed as an external toothing of the output shaft 96". The output shaft 96" can be connected in a rotationally fixed fashion to the driving gear 100". The second sun gear 320" is formed as an external toothing and is connected to a gearwheel 324", wherein the second sun gear 320" and the gearwheel 324" are preferably formed in one piece. The gearwheel 324" meshes with the gearwheel 95 from FIG. 14, which is connected in a rotationally fixed fashion to the ring gear shaft 93".

Alternatively, the ring gear shaft 93" can be connected to a further gearwheel 95" from FIG. 28. The gearwheel 95" then meshes with a gearwheel 324", which is connected in a rotationally fixed fashion to the tension disk 94". As a result, both tension disks 94', 94" can be arranged coaxially on one side of the transmission unit.

As a result of this arrangement illustrated in FIG. 30, two stepped planetary gear mechanisms which serve to rotate the shifting pins 74', 74" are formed.

What is claimed is:

1. A shifting device for a transmission unit of a vehicle operated by muscle force, having a first shaft on which a plurality of idler gears is mounted, a corresponding number of gearwheels, wherein the idler gears and the gearwheels form wheel pairs of two partial transmissions connected in series to each other, wherein the gearwheels of each of the two partial transmissions are mounted on one respective shaft, wherein a shifting assembly is associated to each of the idler gears and wherein the idler gears can each be connected rotationally fixed to the first shaft by means of the respective shifting assembly, wherein the first shaft is formed as a hollow shaft having two shifting pins each assigned to the shifting assemblies of one of the two partial transmissions, wherein the shifting pins are arranged coaxially on the inside of the hollow shaft, wherein the shifting pins have actuation portions by means of which the shifting assemblies can be actuated and wherein the actuation portions are connected rotationally fixed to the shifting pin, wherein the shifting pins are each connected to a driving device which is configured to rotate the shifting pins in order to actuate the respective shifting assemblies of the two partial transmissions independently, wherein the driving device is configured to rotate the corresponding shifting pin and the connected actuation portions by means of a planetary gear mechanism synchronously with respect to the first shaft in order to maintain a shifted state of the shifting assemblies and to rotate the shifting pin in relation to the first shaft in order to carry out a gear change, wherein the shifting assemblies are formed as shiftable freewheels, and wherein the actuation portions are arranged on the shifting pin in such a way that the freewheels of two successive gear stages can be actuated simultaneously.

2. The shifting device as claimed in claim 1, wherein the two shifting pins can be rotated independently of one another.

3. The shifting device as claimed in claim 1, wherein the first shaft is connected in a rotationally fixed fashion to a sun gear of the planetary gear mechanism, and the shifting pin is connected in a rotationally fixed fashion to a planetary carrier of the planetary gear mechanism, and wherein a rotation of a ring gear of the planetary gear mechanism can be transmitted as rotation of the shifting pin in relation to the first shaft.

4. The shifting device as claimed claim 1, wherein the freewheels have shifting pawls which can be engaged with an internal toothing of the idler gears.

5. The shifting device as claimed in claim 1, wherein the driving device has an electric actuator.

6. The shifting device as claimed in claim 5, wherein a stator of the electric actuator can be connected rotationally fixed to the first shaft.

7. The shifting device as claimed in claim 1, wherein the driving device has a hydraulic actuator.

8. The shifting device as claimed in claim 7, wherein the hydraulic actuator has a hydraulic master which is connected rotationally fixed to a transmission housing.

9. The shifting device as claimed in claim 8, wherein the hydraulic actuator has a hydraulic slave which is mounted so as to be capable of rotating in relation to the hydraulic master, wherein the hydraulic slave has a first slave component which is connected rotationally fixed to the first shaft, and wherein the hydraulic slave has a second slave component which is connected rotationally fixed to the shifting pin.

10. The shifting device as claimed in claim 9, wherein the first and second slave components form at least one slave cylinder, and wherein the second slave component forms at least one slave piston, wherein the slave piston is mounted so as to be moveable in a circumferential direction.

11. A shifting device for a transmission unit of a vehicle operated by muscle force, having a first shaft on which a plurality of idler gears is mounted, a corresponding number of gearwheels, which are mounted on at least one second shaft, wherein a shifting assembly is associated to each of the idler gears and wherein the idler gears can each be connected to the first shaft by means of the respective shifting assembly, wherein the first shaft is formed as a hollow shaft having two shifting pins which are arranged coaxially on the inside, wherein the shifting pins have a plurality of actuation portions by means of which the shifting assemblies can be actuated, wherein the actuation portions are connected rotationally fixed to the shifting pins, wherein the shifting pins are connected to a driving device which is configured to rotate the corresponding shifting pin and the actuation portions synchronously with respect to the first shaft in order to maintain a shifted state of the shifting assemblies and to rotate the shifting pins and the actuation portions in relation to the first shaft in order to carry out a gear change.

12. The shifting device as claimed in claim 11, wherein the two shifting pins can be rotated independently of one another.

13. The shifting device as claimed in claim 11, wherein the actuation portions are formed as recesses in the shifting pin.

14. The shifting device as claimed in claim 11, wherein the actuation portions are arranged on the shifting pin in such a way that the freewheels of two successive gear stages can be actuated simultaneously.

15. The shifting device as claimed in claim 11, wherein the actuation portions are formed in such a way that only correspondingly shaped freewheels can be actuated.

16. The shifting device as claimed in claim 11, wherein at least one of the shifting pins is axially displaceable.

17. The shifting device as claimed in claim 11, wherein at least one of the shifting pins has a latching device which secures the shifting pin in different rotational positions in the first shaft.

18. The shifting device as claimed in claim 11, wherein at least one of the shifting pin has an actuation portion by means of which a clutch of a separate partial transmission can be actuated.

19. The shifting device as claimed in one of claims 11, wherein the shifting assemblies are formed as shiftable freewheels.

20. The shifting device as claimed in claim 19, wherein the freewheels have shifting pawls which can be engaged with an internal toothing of the idler gears.

21. The shifting device as claimed in claim 20, wherein a plurality of freewheeling pawls is assigned to each idler gear, wherein the freewheeling pawls of a freewheel are distributed over the circumference of the shaft in such a way that just one of the freewheeling pawls can be placed in engagement simultaneously with the idler gear.

22. The shifting device as claimed in claim 11, wherein the driving device has a rotational speed super-imposition transmission.

23. The shifting device as claimed in claim 22, wherein the rotational speed super-imposition transmission is formed as a planetary gear mechanism.

24. The shifting device as claimed in claim 23, wherein the first shaft is connected in a rotationally fixed fashion to a sun gear of the planetary gear mechanism, and the shifting pin is connected in a rotationally fixed fashion to a planetary carrier of the planetary gear mechanism, and wherein rotation of a ring gear of the planetary gear mechanism can be transmitted as rotation of the shifting pin in relation to the first shaft.

25. The shifting device as claimed in claim 23, wherein the planetary gear mechanism is formed as a stepped planetary gear mechanism.

26. A shifting device for a transmission unit of a vehicle operated by muscle force, having a first shaft on which a plurality of idler gears is mounted, a corresponding number of gearwheels, which are mounted on at least one second shaft, wherein a shifting assembly is associated to each of the idler gears and wherein the idler gears can each be connected to the first shaft by means of the respective shifting assembly, wherein the first shaft is formed as a hollow shaft having a shifting pin which is arranged coaxially on the inside, wherein the shifting pin has a plurality of actuation portions by means of which the shifting assemblies can be actuated, wherein the actuation portions are connected rotationally fixed to the shifting pin, wherein the shifting pin is connected to a driving device which is configured to rotate the shifting pin and the actuation portions synchronously with respect to the first shaft in order to maintain a shifted state of the shifting assemblies and to rotate the shifting pin and the actuation portions in relation to the first shaft in order to carry out a gear change.

* * * * *